(12) United States Patent
Umebayashi

(10) Patent No.: US 10,508,210 B2
(45) Date of Patent: Dec. 17, 2019

(54) ACTINIC RAY-CURABLE-TYPE INKJET INK SET FOR THREE-DIMENSIONAL PRINTING, THREE-DIMENSIONAL PRINTING METHOD, AND THREE-DIMENSIONAL PRINTING SYSTEM

(71) Applicant: FUJIFILM CORPORATION, Minato-ku, Tokyo (JP)

(72) Inventor: Tsutomu Umebayashi, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 67 days.

(21) Appl. No.: 15/823,624

(22) Filed: Nov. 28, 2017

(65) Prior Publication Data
US 2018/0079923 A1 Mar. 22, 2018

Related U.S. Application Data

(63) Continuation of application No. PCT/JP2016/065914, filed on May 30, 2016.

(30) Foreign Application Priority Data

Jun. 8, 2015 (JP) .................................. 2015-115608

(51) Int. Cl.
*C09D 11/40* (2014.01)
*C09D 11/10* (2014.01)
(Continued)

(52) U.S. Cl.
CPC .............. *C09D 11/40* (2013.01); *B33Y 30/00* (2014.12); *B33Y 70/00* (2014.12); *B41M 5/0023* (2013.01);
(Continued)

(58) Field of Classification Search
CPC ........ C09D 11/101; C09D 11/30; C09D 11/38; C09D 11/40; C09D 11/322; B29M 5/0023; B29M 5/00; B29C 67/00
See application file for complete search history.

(56) References Cited

U.S. PATENT DOCUMENTS 6,799,959 B1   10/2004   Tochimoto et al.
7,851,122 B2   12/2010   Napadensky
(Continued)

FOREIGN PATENT DOCUMENTS

EP   1661690 A1   5/2006
EP   2233538 A1   9/2010
(Continued)

OTHER PUBLICATIONS

International Search Report issued in International Application No. PCT/JP2016/065914 dated Jun. 21, 2016.
(Continued)

*Primary Examiner* — Sanza L. McClendon
(74) *Attorney, Agent, or Firm* — Solaris Intellectual Property Group, PLLC

(57) ABSTRACT

An actinic ray-curable-type inkjet ink set for three-dimensional printing and a three-dimensional printing system are provided. The actinic ray-curable-type inkjet ink set for three-dimensional printing includes a white ink composition W and a color ink composition C. The three-dimensional printing system includes printing means for jetting out, a plurality of times, each of a white ink composition W and a color ink composition C using an inkjet head so as to form a color layer on a white modeled object, based on cross-sectional information of a three-dimensional modeled object.

6 Claims, 2 Drawing Sheets

(51) Int. Cl.
 *B33Y 70/00* (2015.01)
 *B33Y 30/00* (2015.01)
 *B41M 5/00* (2006.01)
 *C09D 11/101* (2014.01)
 *C09D 11/322* (2014.01)
 *C09D 11/38* (2014.01)

(52) U.S. Cl.
 CPC .......... *C09D 11/101* (2013.01); *C09D 11/322* (2013.01); *C09D 11/38* (2013.01)

(56) References Cited

U.S. PATENT DOCUMENTS

| | | | |
|---|---|---|---|
| 8,366,818 B2 * | 2/2013 | Umebayashi | C09D 11/101 106/31.13 |
| 2002/0167101 A1 | 11/2002 | Tochimoto et al. | |
| 2005/0001356 A1 | 1/2005 | Tochimoto et al. | |
| 2011/0200794 A1 | 8/2011 | Kida et al. | |
| 2013/0260092 A1 | 10/2013 | Araki et al. | |
| 2015/0190964 A1 | 7/2015 | Okamoto | |
| 2015/0353751 A1 | 12/2015 | Umebayashi | |
| 2017/0252971 A1 | 9/2017 | Umebayashi | |

FOREIGN PATENT DOCUMENTS

| | | |
|---|---|---|
| EP | 2803705 A1 | 11/2014 |
| JP | 2000-280354 A | 10/2000 |
| JP | 2001-150556 A | 6/2001 |
| JP | 2011-122063 A | 6/2011 |
| JP | 2011-162703 A | 8/2011 |
| JP | 2012-111226 A | 6/2012 |
| JP | 2012-214603 A | 11/2012 |
| JP | 2013-142151 A | 7/2013 |
| JP | 2013-227515 A | 11/2013 |
| JP | 2014-172971 A | 9/2014 |
| JP | 2015-078255 A | 4/2015 |
| JP | 2015-131398 A | 7/2015 |
| JP | 2016-65212 A | 4/2016 |
| WO | 2014/136923 A1 | 9/2014 |
| WO | 2016/098636 A1 | 6/2016 |

OTHER PUBLICATIONS

Written Opinion of the ISA issued in International Application No. PCT/JP2016/065914 dated Jun. 21, 2016.
Extended European Search Report dated Mar. 5, 2018, issued in corresponding EP Patent Application No. 16807318.7.
English language translation of the following: Office action dated Jul. 31, 2018 from the JPO in a Japanese patent application No. 2017-523588 corresponding to the instant patent application.

* cited by examiner

ACTINIC RAY-CURABLE-TYPE INKJET INK SET FOR THREE-DIMENSIONAL PRINTING, THREE-DIMENSIONAL PRINTING METHOD, AND THREE-DIMENSIONAL PRINTING SYSTEM

CROSS-REFERENCE TO RELATED APPLICATIONS

This application is a continuation application of International Application No. PCT/JP2016/065914, filed May 30, 2016, the disclosure of which is incorporated herein by reference in its entirety. Further, this application claims priority from Japanese Patent Application No. 2015-115608, filed Jun. 8, 2015, the disclosure of which is incorporated herein by reference in its entirety.

BACKGROUND OF THE PRESENT INVENTION

1. Field of the Present Invention

The present invention relates to an actinic ray-curable-type inkjet ink set for three-dimensional printing, a three-dimensional printing method, and a three-dimensional printing system.

2. Description of the Related Art

An optical stereoscopic modeling method is a method of molding a stereoscopically modeled object having a desired shape by selectively conducting the supply of necessary energy to a photocurable composition.

As a representative example of the stereoscopic modeling method, the liquid surface of a photocurable composition contained in a container is selectively irradiated with light, for example, ultraviolet laser light, so as to obtain a cured layer having a desired pattern, and thus a cured layer is obtained. Next, the photocurable composition is supplied in a layer form on the cured layer, and then the photocurable composition is selectively irradiated with light in the same manner as described above so as to form a cured layer that is continued from the above-mentioned cured layer. The stereoscopic modeling method is a method of repeating this lamination operation, and thereby obtaining a finally desired stereoscopic three-dimensional modeled object. This stereoscopic modeling method is attracting public attention since an intended modeled object is obtained easily in a short period of time even in a case in which the shape of the modeled object to be produced is complicated.

Furthermore, in recent years, stereolithography methods based on an inkjet system have been proposed, and it has been enabled to perform stereolithography by curing a liquid photocurable resin discharged through an inkjet nozzle, and laminating the photocurable resin compared to conventional methods. Thus, there is an advantage that installation of a large-sized resin liquid tank or a dark room as in conventional cases is unnecessary. While stereolithography machines are compact and can be miniaturized, stereolithography methods are attracting attention as three-dimensional computer aided design (3D CAD), by which a stereoscopic model can be freely produced by using a CAD system.

Stereolithography methods of the related art include those methods described in JP2012-111226A and U.S. Pat. No. 7,851,122B.

SUMMARY OF THE PRESENT INVENTION

A three-dimensional modeled object produced by stereolithography methods based on an inkjet system of the related art has been widely used for manufacturing prototypes of industrial products, and thus color requirements for the three-dimensional modeled object itself were small. In recent years, stereolithography methods also have become to be used for small lot toys products such as dolls of animation characters, stationery such as ballpoint pens, ornaments, and the like, and therefore three-dimensional modeled objects in full color became strongly desired.

The inventors of the present invention have found that in a case where a current commercially available printer and modeling material are used, sufficient performance which may be a deterioration in mechanical properties such as irregularities on a color portion against rubbing and cracking at the time of stretching or bending is not obtained in full color products, and therefore have completed the present invention.

Mechanical properties specifically refer to impact resistance and load-bearing capacity in a hard three-dimensional modeled object, or film softness and film strength in a soft three-dimensional modeled object.

An object to be solved by the present invention is to provide an actinic ray-curable-type inkjet ink set for three-dimensional printing by which a three-dimensional modeled object which is excellent in moldability, covering ability, and mechanical properties is obtained in full color, and a three-dimensional printing method.

Furthermore, an object to be solved by the present invention is to provide a three-dimensional printing system by which operability of a worker is improved in separating a hard modeled object and a soft modeled object.

The objects described above have been achieved by means described in <1>, <6> or <8>. These means will be listed below together with preferred embodiments <2> to <5> and <7>.

<1> An actinic ray-curable-type inkjet ink set for three-dimensional printing, comprises a white ink composition W having the following composition; and a color ink composition C having the following composition.

The white ink composition W contains a white pigment and a polymerizable compound, in which a content of the white pigment is 0.5% by mass to 10% by mass with respect to a total mass of the white ink composition W.

The color ink composition C contains a colorant, an acrylate monomer AC which forms a homopolymer having a glass transition temperature of 25° C. to 120° C., and an acrylate monomer BC which forms a homopolymer having a glass transition temperature of −60° C. or higher and lower than 25° C., in which, with respect to a total mass of the color ink composition C, a content of the acrylate monomer AC is 5% by mass or more and less than 50% by mass and a content of the acrylate monomer BC is 20% by mass or more and less than 80% by mass.

<2> The actinic ray-curable-type inkjet ink set for three-dimensional printing according to <1>, comprises a white ink composition W1 having the following composition as the white ink composition W.

The white ink composition W1 contains, as the polymerizable compound, an acrylate monomer AW which forms a homopolymer having a glass transition temperature of 25° C. to 120° C., in which, with respect to a total mass of the white ink composition W1, a content of the acrylate monomer AW in the white ink composition W1 is 40% by mass or more and less than 80% by mass.

<3> The actinic ray-curable-type inkjet ink set for three-dimensional printing according to <1> or <2>, comprises a white ink composition W2 having the following composition as the white ink composition W.

The white ink composition W2 contains, as the polymerizable compound, an acrylate monomer AW which forms a homopolymer having a glass transition temperature of 25° C. to 120° C., an acrylate monomer BW which forms a homopolymer having a glass transition temperature of −60° C. or higher and lower than 25° C., and a bifunctional acrylate oligomer CW having a weight-average molecular weight of 2,000 to 20,000, in which, with respect to a total mass of the white ink composition W2, a content of the acrylate monomer AW in the white ink composition W2 is 5% by mass or more and less than 40% by mass, a content of the acrylate monomer BW in the white ink composition W2 is 30% by mass or more and less than 80% by mass, and a content of the acrylate oligomer CW in the white ink composition W2 is 5% by mass or more and less than 20% by mass.

<4> The actinic ray-curable-type inkjet ink set for three-dimensional printing according to any one of <1> to <3>, comprises a color ink composition C1 having the following composition as the color ink composition C.

The color ink composition C1 further contains a bifunctional acrylate oligomer CC having a weight-average molecular weight of 2,000 to 20,000, in which, with respect to a total mass of the color ink composition C1, a content of the acrylate monomer AC in the color ink composition C1 is 5% by mass or more and less than 40% by mass, a content of the acrylate monomer BC in the color ink composition C1 is 30% by mass or more and less than 80% by mass, and a content of the acrylate oligomer CC in the color ink composition C1 is 5% by mass or more and less than 20% by mass.

<5> The actinic ray-curable-type inkjet ink set for three-dimensional printing according to any one of <1> to <4>, further comprises an ink composition for a support material having the following composition.

The ink composition for a support material contains a monofunctional acrylate compound, a polymerization initiator, and a water-soluble non-curing component, in which, with respect to a total mass of the ink composition for a support material, a content of a polyfunctional acrylate compound is 5% by mass or less, and a colorant is not substantially contained in the ink composition for a support material.

<6> A three-dimensional printing method, comprises jetting out, a plurality of times, each of the white ink composition W and the color ink composition C contained in the inkjet ink set for three-dimensional printing according to any one of <1> to <4> using an inkjet head so as to form a color layer on a white modeled object based on cross-sectional information of a three-dimensional modeled object.

<7> The three-dimensional printing method according to <6>, in which, in the forming of the color layer, an ink composition for a support material having the following composition is further jetted out a plurality of times.

The ink composition for a support material contains a monofunctional acrylate compound, a polymerization initiator, and a water-soluble non-curing component, in which, with respect to a total mass of the ink composition for a support material, a content of a polyfunctional acrylate compound is 5% by mass or less, and a colorant is not substantially contained in the ink composition for a support material.

<8> A three-dimensional printing system, comprises printing means for jetting out, a plurality of times, each of the following white ink composition W and the following color ink composition C using an inkjet head so as to form a color layer on a white modeled object, based on cross-sectional information of a three-dimensional modeled object.

The inkjet head used for jetting out the white ink composition W is capable of being filled with any one of the following white ink composition W1 and the following white ink composition W2 as a white ink composition.

The white ink composition W contains a white pigment and a polymerizable compound, in which a content of the white pigment is 0.5% by mass to 10% by mass with respect to a total mass of the white ink composition W.

The color ink composition C contains a colorant, an acrylate monomer AC which forms a homopolymer having a glass transition temperature of 25° C. to 120° C., and an acrylate monomer BC which forms a homopolymer having a glass transition temperature of −60° C. or higher and lower than 25° C., in which, with respect to a total mass of the color ink composition C, a content of the acrylate monomer AC is 5% by mass or more and less than 50% by mass, and a content of the acrylate monomer BC is 20% by mass or more and less than 80% by mass.

The white ink composition W1 contains, as a polymerizable compound, an acrylate monomer AW which forms a homopolymer having a glass transition temperature of 25° C. or higher and lower than 120° C., in which a content of the acrylate monomer AW in the white ink composition W1 is 40% by mass or more and less than 80% by mass with respect to a total mass of the white ink composition W1.

The white ink composition W2 contains, as a polymerizable compound, an acrylate monomer AW which forms a homopolymer having a glass transition temperature of 25° C. to 120° C., an acrylate monomer BW which forms a homopolymer having a glass transition temperature of −60° C. or higher and less than 25° C., and a bifunctional acrylate oligomer CW having a weight-average molecular weight of 2,000 to 20,000, in which, with respect to a total mass of the white ink composition W2, a content of the acrylate monomer AW in the white ink composition W2 is 5% by mass or more and less than 40% by mass, a content of the acrylate monomer BW in the white ink composition W2 is 30% by mass or more and less than 80% by mass, and a content of the acrylate oligomer CW in the white ink composition W2 is 5% by mass or more and less than 20% by mass.

According to the present invention, an actinic ray-curable-type inkjet ink set for three-dimensional printing by which a three-dimensional modeled object which is excellent in moldability, covering ability, and mechanical properties is obtained in full color, and a three-dimensional printing method can be provided.

Furthermore, according to the present invention, a three-dimensional printing system by which operability of a worker is improved in separating a hard modeled object and a soft modeled object can be provided.

DESCRIPTION OF THE PREFERRED EMBODIMENTS

Figure 1:
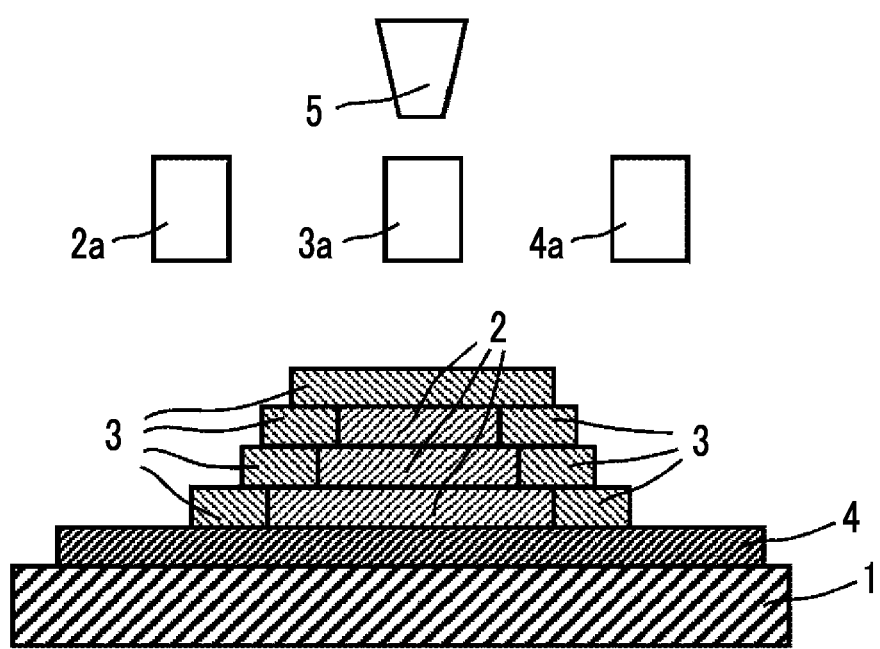
FIG. 1 is a schematic diagram showing an example of three-dimensional printing using a three-dimensional printing method of the present invention.

In the following description, the present invention will be described in detail. The description on constituent elements described below may be based on representative embodiments of the present invention; however, the present invention is not intended to be limited to those embodiments.

According to the present invention, the description of "lower limit to upper limit" indicating a numerical value range represents "more than or equal to the lower limit, and less than or equal to the upper limit"; and the description of "upper limit to lower limit" represents "less than or equal to the upper limit, and more than or equal to the lower limit". That is, the descriptions represent numerical value ranges respectively including an upper limit and a lower limit.

Furthermore, in regard to a description of a group (atomic group) in the present specification, a description that does not indicate substitution or unsubstitution is meant to include a group that does not have a substituent, as well as a group having a substituent. For example, an "alkyl group" is meant to include an alkyl group that does not have a substituent (unsubstituted alkyl group) as well as an alkyl group that has a substituent (substituted alkyl group).

According to the present invention, "percent (%) by mass" and "percent (%) by weight" have the same meaning, and "parts by mass" and "parts by weight" have the same meaning.

According to the present invention, a combination of two or more preferred embodiments is a more preferred embodiment.

(Actinic Ray-Curable-Type Inkjet Ink Set for Three-Dimensional Printing)

The actinic ray-curable-type inkjet ink set (hereinafter, also simply referred to as ink set") for three-dimensional printing (also referred to as "3D printing" or "three-dimensional modeling") of the present invention includes is an ink set including a plurality of ink compositions, and is characterized to include a white ink composition W having the following composition and a color ink composition C having the following composition.

The white ink composition W contains a white pigment and a polymerizable compound, in which a content of the white pigment is 0.5% to 10% by mass with respect to a total mass of the white ink composition W.

The color ink composition C contains a colorant, an acrylate monomer AC which forms a homopolymer having a glass transition temperature of 25° C. to 120° C. (hereinafter, also simply referred to as acrylate monomer AC), and an acrylate monomer BC which forms a homopolymer having a glass transition temperature of −60° C. or higher and lower than 25° C. (hereinafter, also simply referred to as acrylate monomer BC), in which, with respect to a total mass of the color ink composition C, a content of the acrylate monomer AC is 5% by mass or more and less than 50% by mass and a content of the acrylate monomer BC is 20% by mass to 80% by mass.

In the present invention, a monomer is a compound having a molecular weight of less than 1,000, and an oligomer is a polymer to which a limited number (generally 5 to 200) of monomers are bonded in general and is a compound having a weight-average molecular weight of 1,000 to 20,000, and a polymer is a compound having a weight-average molecular weight of more than 20,000.

In addition, in the present invention, a case in which "ink composition" is simply referred represents the white ink composition W, the color ink composition C, or an ink composition for a support material to be described later.

The inventors of the present invention conducted a thorough investigation, and as a result, they found that a three-dimensional modeled object which is excellent in moldability, covering ability, and mechanical properties can be obtained in full color by using the actinic ray-curable-type inkjet ink set for three-dimensional printing of the present invention.

In addition, the inventors of the present invention found that a three-dimensional modeled object which has excellent impact resistance and load-bearing capacity and in which the range of color selection of a color portion is wide and color saturation is high can be obtained by using the ink set of the present invention.

The term "three-dimensional printing" according to the present invention means a printing method of forming a plurality of ink layers by laminating the layers, in which 50 or more layers are laminated. It is preferably a printing method in which 500 or more ink layers are laminated.

The specific mechanism by which the above-described effects are manifested is not clearly understood; however, it is speculated that the effects are manifested concertedly by combining the white ink composition W with the color ink composition C.

A three-dimensional modeled object manufactured by using the actinic ray-curable-type inkjet ink set for three-dimensional printing of the present invention can be suitably used for applications such as toys, figurines, and ornaments.

The "actinic ray" in the present invention is not particularly limited as long as it is actinic ray that can apply energy capable of generating an initiating species in an ink composition in a case where the actinic ray is radiated, and actinic rays broadly include α-rays, γ-rays, X-rays, ultraviolet radiation (UV), visible light, and an electron beam. However, above all, from the viewpoints of curing sensitivity and easy availability, ultraviolet radiation and an electron beam are preferred, and ultraviolet radiation is particularly preferred. Therefore, the ink composition contained in the ink set of the present invention is preferably an ink composition that can be cured in a case where irradiated with ultraviolet radiation as actinic rays.

According to the present invention, unless particularly stated otherwise, the term "acrylate" refers to both or any one of "acrylate" and "methacrylate", and the term "acrylic" refers to both or any one of "acrylic" and "methacrylic".

Specifically, for example, the acrylate monomer AC may be an acrylate compound, or may be a methacrylate compound.

According to the present invention, the glass transition temperature (Tg) of a homopolymer (monopolymer) of a monomer is measured using a dynamic viscoelasticity analyzer (DMA). The glass transition temperature of a homopolymer may vary depending on the degree of polymerization; however, in a case where a homopolymer having a weight-average molecular weight of 20,000 or more is produced and measured, the influence caused by the degree of polymerization can be neglected. In this invention, a value measured using a sample polymerized until the influence caused by the degree of polymerization can be neglected was designated as the glass transition temperature (Tg).

<White Ink Composition W>

The white ink composition W used in the present invention contains a white pigment and a polymerizable compound, in which a content of the white pigment is 0.5% to 10% by mass with respect to a total mass of the white ink composition W. In addition, the content of the polymerizable compound is preferably 70% to 95% by mass with respect to a total mass of the white ink composition W.

[White Ink Composition W1]

The actinic ray-curable-type inkjet ink set for three-dimensional printing of the present invention preferably contains the following white ink composition W1 as a white ink composition W.

The white ink composition W1 contains, as the polymerizable compound, an acrylate monomer AW which forms a homopolymer having a glass transition temperature of 25° C. to 120° C., in which, with respect to a total mass of the white ink composition W1, a content of the acrylate monomer AW in the white ink composition W1 is 40% by mass or more and less than 80% by mass.

The three-dimensional modeled object which is excellent in impact resistance can be obtained by the ink set of the present invention containing white ink composition W1.

The content of the acrylate monomer AW in the white ink composition W1 is 40% by mass or more and less than 80% by mass, and is preferably 50% by mass or more and less than 70% by mass with respect to a total mass of the white ink composition W1.

In a case where the content of the acrylate monomer AW is within the above range, the three-dimensional modeled object which is excellent in impact resistance and load-bearing capacity can be obtained.

[White Ink Composition W2]

The actinic ray-curable-type inkjet ink set for three-dimensional printing of the present invention preferably contains the following white ink composition W2 as a white ink composition W.

The white ink composition W2 contains, as the polymerizable compound, an acrylate monomer AW which forms a homopolymer having a glass transition temperature of 25° C. to 120° C., an acrylate monomer BW which forms a homopolymer having a glass transition temperature of −60° C. or higher and lower than 25° C., and a bifunctional acrylate oligomer CW having a weight-average molecular weight of 2,000 to 20,000, in which, with respect to a total mass of the white ink composition W2, a content of the acrylate monomer AW in the white ink composition W2 is 5% by mass or more and less than 40% by mass, a content of the acrylate monomer BW in the white ink composition W2 is 30% by mass or more and less than 80% by mass, and a content of the acrylate oligomer CW in the white ink composition W2 is 5% by mass or more and less than 20% by mass.

The three-dimensional modeled object which is excellent in film softness and film strength can be obtained by the ink set of the present invention containing the white ink composition W2.

The content of the acrylate monomer AW in the white ink composition W2 is 5% by mass or more and less than 40% by mass, and is preferably 10% by mass or more and less than 30% by mass with respect to a total mass of the white ink composition W2.

The content of the acrylate monomer BW in the white ink composition W2 is 30% by mass or more and less than 80% by mass, and is preferably 40% by mass or more and less than 70% by mass with respect to a total mass of the white ink composition W2.

The content of the acrylate oligomer CW in the white ink composition W2 is 5% by mass or more and less than 20% by mass, and is preferably 8% by mass or more and less than 17% by mass with respect to a total mass of the white ink composition W2.

In a case where the content of the acrylate monomer AW, the acrylate monomer BW, and the acrylate oligomer CW is within the above range, the film softness can be compatible with the film strength in the three-dimensional modeled object to be obtained, and the failure due to the removal of the support material can be reduced.

In addition, the actinic ray-curable-type inkjet ink set for three-dimensional printing of the present invention preferably contains the white ink composition W1 and the white ink composition W2.

According to the embodiment, it is possible to individually produce a so-called hard three-dimensional modeled object which is excellent in impact resistance and a so-called soft three-dimensional modeled object which is excellent in film softness and film strength by changing the white ink composition W.

Hereinafter, the white pigment, the polymerizable compound, and the other arbitrary components contained in the white ink composition W will be explained.

[White Pigment]

The white pigment in the white ink composition W is not particularly limited, but it is possible to utilize basic lead carbonate ($2PbCO_3Pb(OH)_2$, so-called Silver White), zinc oxide (ZnO, so-called Zinc White), titanium oxide ($TiO_2$, so-called Titanium White), strontium titanate ($SrTiO_3$, so-called Titanium Strontium White), and the like.

Here, titanium oxide has a small specific weight and a large refractive index, and is chemically and physically stable, compared to other white pigments. Therefore, titanium oxide has high covering power or coloring power as a pigment, and also has excellent durability against acid, alkali, and other environments. Therefore, it is preferable to utilize titanium oxide as a white pigment. Of course, other white pigments (may be pigments other than those white pigments listed above) may also be used, as necessary.

The white pigment may be added directly together with each component on the occasion of preparing the white ink composition W. Also, for the reason of enhancing dispersibility, the colorant may be added to a dispersing medium such as a solvent or a monomer in advance, uniformly dispersing or dissolving the colorant therein, and then the resultant may be mixed into the ink composition.

Regarding the dispersing medium for various components such as a white pigment, a solvent may be added, or without solvent, the polymerizable compound to be described later which is a low molecular weight component may also be used as a dispersing medium. However, in order to cure the white ink composition W by irradiating the ink composition with actinic rays, it is preferable that no solvent is used. This is because in a case where there is residual solvent in the cured ink layer formed from the cured ink composition, solvent resistance may be deteriorated, or there may be a problem with the volatile organic compound (VOC) of the residual solvent. From this point of view, a monomer is used as a dispersing medium, and above all, it is preferable to select a monomer having the lowest viscosity, from the viewpoint of enhancing dispersion suitability or handleability of the white ink composition W.

The average particle size of the white pigment used herein is preferably 0.01 to 0.4 μm, and more preferably 0.02 to 0.2 μm, since excellent color developability is obtained as the particles are finer. Selection of the white pigment, a dispersant to be described later, and the dispersing medium, and the conditions for dispersing and conditions for filtration are set such that the maximum particle size is preferably set to be 3 μm or less, and more preferably 1 μm or less. Through this management of particle size, clogging of the head nozzle can be suppressed, and preservation stability, transparency and curing sensitivity of the white ink composition W can be maintained. According to the present invention, by using the above-mentioned dispersant having excellent dispersibility and stability, a uniform and stable dispersion is obtained even in a case in which a particulate white pigment is used.

The particle size of the white pigment can be measured by a known measurement method. Specifically, the particle size can be measured by a centrifugal sedimentation light transmission method, an X-ray transmission method, a laser diffraction/scattering method, or a dynamic light scattering method. According to the present invention, a value obtained by measurement using a laser diffraction/scattering method is employed.

In addition, the white pigment may be used singly, or two or more kinds thereof may be used in combination.

The content of the white pigment is 0.5 to 10% by mass and is preferably 1.0 to 10% by mass with respect to a total mass of the white ink composition W.

[Polymerizable Compound]

The white ink composition W used in the present invention contains the polymerizable compound.

Examples of the polymerizable compound include the acrylate monomer AW, the acrylate monomer BW, and the acrylate oligomer CW.

—Acrylate Monomer AW—

The white ink composition W used in the present invention preferably contains the acrylate monomer AW which forms a homopolymer having a glass transition temperature of 25° C. to 120° C.

The acrylate monomer AW may be an acrylate compound or may be a methacrylate compound, but is preferably an acrylate compound.

The glass transition temperature of a homopolymer of the acrylate monomer AW is from 25° C. to 120° C., preferably from 30° C. to 100° C., and more preferably from 60° C. to 100° C. In a case where the above-described embodiment is employed, the three-dimensional modeled object thus obtainable has superior softness and tensile strength, and the occurrence of failure at the time of removing the support material can be suppressed.

The acrylate monomer AW may be a monofunctional acrylate monomer, or may be a polyfunctional acrylate monomer; however, the acrylate monomer A is preferably a monofunctional acrylate monomer.

It is also preferable that the acrylate monomer AW is an acrylate monomer having a hydrocarbon ring structure.

Specific examples of the acrylate monomer AW include isobornyl acrylate, isobornyl methacrylate, cyclohexyl acrylate, cyclohexyl methacrylate, t-butyl acrylate, t-butyl methacrylate, t-butylcyclohexyl acrylate, methyl methacrylate, ethyl methacrylate, propyl methacrylate, phenyl acrylate, phenyl methacrylate, benzyl acrylate, benzyl methacrylate, phenethyl acrylate, phenethyl methacrylate, dicyclopentanyl acrylate, 2-hydroxyethyl methacrylate, 2-methacryloyloxyethyl hexahydrophthalic acid, 3-hydroxypropyl methacrylate, 2-methacryloyloxyethyl phthalic acid, 3,3,5-trimethyl cyclohexyl acrylate, 3,3,5-trimethylcyclohexyl methacrylate, dicyclopentenyl acrylate, and 1,6-hexanediol diacrylate.

Among these, it is preferable that the acrylate monomer AW includes a monomer selected from the group consisting of isobornyl acrylate, t-butylcyclohexyl acrylate, 3,3,5-trimethylcyclohexyl acrylate, and dicyclopentanyl acrylate; and it is more preferable that the acrylate monomer A includes isobornyl acrylate and/or 3,3,5-trimethylcyclohexyl acrylate. According to the above-described embodiment, the three-dimensional modeled object thus obtainable has superior tensile strength, and the occurrence of failure at the time of removing the support material can be suppressed.

Regarding the acrylate monomer AW, one kind of monomer may be included, or two or more kinds of monomers may also be included.

—Acrylate Monomer BW—

The white ink composition W used in the present invention preferably contains an acrylate monomer BW which forms a homopolymer having a glass transition temperature of −60° C. or higher and lower than 25° C.

The acrylate monomer BW may be an acrylate compound, or may be a methacrylate compound; however, it is preferable that the acrylate monomer B is an acrylate compound.

The glass transition temperature of a homopolymer of the acrylate monomer BW is −60° C. or higher and lower than 25° C., preferably from −30° C. to 10° C., and more preferably from −10° C. to 10° C. According to the above-described embodiment, the three-dimensional modeled object thus obtainable has superior softness and tensile strength, and also has excellent moldability.

Furthermore, the acrylate monomer BW may be a monofunctional acrylate monomer, or may be a polyfunctional acrylate monomer; however, it is preferable that the acrylate monomer B is a monofunctional acrylate monomer.

It is also preferable that the acrylate monomer BW is an acrylate monomer having an ether bond and/or an alkyl group having 8 or more carbon atoms.

Preferred examples of the acrylate monomer BW include a long-chain alkyl (having 8 or more carbon atoms) acrylate compound, an acrylate compound having a polyethylene oxide or polypropylene oxide chain, and a phenoxyethyl acrylate compound.

Examples of the long-chain alkyl acrylate compound include 2-ethylhexyl acrylate, n-octyl acrylate, n-nonyl acrylate, n-decyl acrylate, isooctyl acrylate, n-lauryl acrylate, n-tridecyl acrylate, n-cetyl acrylate, n-stearyl acrylate, isomyristyl acrylate, and isostearyl acrylate.

Examples of the acrylate compound having a polyethylene oxide or polypropylene oxide chain include (poly) ethylene glycol monoacrylate, (poly)ethylene glycol acrylate methyl ester, (poly)ethylene glycol acrylate ethyl ester, (poly)ethylene glycol acrylate phenyl ester, (poly)propylene glycol monoacrylate, (poly)propylene glycol monoacrylate phenyl ester, (poly)propylene glycol acrylate methyl ester, (poly)propylene glycol acrylate ethyl ester, methoxy triethylene glycol acrylate, methoxy dipropylene glycol acrylate, ethoxy diethylene glycol acrylate(ethoxyethoxyethyl acrylate), and methoxy polyethylene glycol acrylate.

Examples of the phenoxyethyl acrylate compound include phenoxyethyl acrylate, phenoxy diethylene glycol acrylate, phenoxy polyethylene glycol acrylate, 2-hydoxy-3-phenoxypropyl acrylate, and an ethylene oxide adduct of nonylphenol acrylate.

Further preferred examples of the acrylate monomer BW include tetrahydrofurfuryl acrylate and 2-(N-butylcarbamoyloxy)ethyl acrylate (1,2-ethanediol 1-acrylato 2-(N-butylcarbamate)) acrylate.

Among these, the acrylate monomer BW preferably includes a monomer selected from the group consisting of phenoxyethyl acrylate, n-stearyl acrylate, isodecyl acrylate, ethoxyethoxyethyl acrylate, tetrahydrofurfuryl acrylate, n-lauryl acrylate, n-octyl acrylate, n-decyl acrylate, isooctyl acrylate, n-tridecyl acrylate, and 2-(N-butylcarbamoyloxy) ethyl acrylate, more preferably includes phenoxyethyl acrylate and/or n-stearyl acrylate, and further more preferably includes phenoxyethyl acrylate. According to the above-described embodiment, the three-dimensional modeled object thus obtainable has superior softness and tensile strength, and also has excellent moldability.

Regarding the acrylate monomer BW, one kind thereof may be included, or two or more kinds thereof may also be included.

—Acrylate Oligomer CW—

The white ink composition W used in the present invention preferably contains a bifunctional acrylate oligomer CW having a weight-average molecular weight of from 2,000 to 20,000.

The acrylate oligomer CW may have an acryloyloxy group, or may have a methacryloyloxy group; however, it is preferable that the acrylate oligomer C has an acryloyloxy group.

The acrylate oligomer CW is an oligomer having two units in total of an acryloyloxy group and/or a methacryloyloxy group. In a case where the ink composition includes only monofunctional acrylate oligomers, the three-dimensional modeled object thus obtainable has poor tensile strength, and in a case where the ink composition includes only trifunctional or higher-functional acrylate oligomers, the three-dimensional modeled object thus obtainable has poor softness.

The weight-average molecular weight (Mw) of the acrylate oligomer CW is from 2,000 to 20,000, preferably from 5,000 to 20,000, and more preferably from 10,000 to 20,000. According to the above-described embodiment, the three-dimensional modeled object thus obtainable has superior softness and tensile strength.

Regarding the method for measuring the weight-average molecular weight of the acrylate oligomer, the weight-average molecular weight is measured by performing a gel permeation chromatography (GPC) analysis.

More particularly, regarding the measurement conditions for GPC, HLC-8220 GPC of Tosoh Corporation is used, three TSK gel SuperAWM-H columns are connected and used, N-methylpyrrolidone (10 mM LiBr) is used as a solvent, and measurement is performed at a flow rate of 0.5 mL/min. Furthermore, the concentration of the sample is set to 0.1% by mass, the injection amount is set to 60 µL, and the measurement temperature is set to 40° C. Regarding the detector, an RI detector (differential refractometer) is used.

Young's modulus at 25° C. of the acrylate oligomer CW is preferably 1 to 100 MPa, more preferably 2 to 80 MPa, even more preferably 3 to 50 MPa, and particularly preferably 10 to 30 MPa. According to the range described above, the three-dimensional modeled object thus obtainable has superior softness and tensile strength.

Young's modulus at 25° C. of the acrylate oligomer CW according to the present invention is Young's modulus at 25° C. of a monopolymer (homopolymer) of the acrylate oligomer CW.

The method for measuring Young's modulus at 25° C. according to the present invention is carried out by the following method.

A liquid obtained by mixing 2% by mass of IRGACURE 819 (manufactured by BASF SE), 2% by mass of IRGACURE 184 (manufactured by BASF SE), and 96% by mass of the oligomer to be measured is applied with a bar coater to form a coating film having a thickness of 100 µm, and the coating film is cured in an ultraviolet (UV) exposure machine. At this time, the coating film was cured to the extent that the influence of the degree of polymerization of the cured film could be neglected. This cured film is cut into a short strip having a size of 15 mm×50 mm, and Young's modulus is measured using a tensile testing machine (AUTOGRAPH AGS-X 5KN, manufactured by Shimadzu Corporation). Furthermore, the value of Young's modulus is measured at a portion having an elongation of 1%. Furthermore, during the test, the sample was pulled in the longitudinal direction, and the parts extending for about 10 mm respectively from the top and the bottom were clamped.

The acrylate oligomer CW is not particularly limited as long as it is, for example, an oligomer having two units in total of an acryloyloxy group and/or a methacryloyloxy group and having a Mw of from 2,000 to 20,000, and examples thereof include olefin-based oligomers (an ethylene oligomer, a propylene oligomer, a butene oligomer, and the like), vinyl-based oligomers (a styrene oligomer, a vinyl alcohol oligomer, a vinylpyrrolidone oligomer, an acrylic resin oligomer, and the like), diene-based oligomers (a butadiene oligomer, a chloroprene rubber, a pentadiene oligomer, and the like), ring-opened polymerized oligomers (di-, tri-, and tetraethylene glycol, polyethylene glycol, polyethylimine, and the like), polyaddition-based oligomers (an oligo ester acrylate, a polyamide oligomer, and a polyisocyanate oligomer), and addition-condensation oligomers (a phenolic resin, an amino resin, a xylene resin, a ketone resin, and the like).

Among these, a urethane acrylate oligomer, a polyester acrylate oligomer, or an epoxy acrylate oligomer is preferred; a urethane acrylate oligomer or a urethane acrylate oligomer having a polyester chain is more preferred; and a urethane acrylate oligomer is even more preferred.

Regarding the urethane acrylate oligomer, polyester acrylate oligomer, and epoxy acrylate oligomer, reference can be made to the Oligomer Handbook (reviewed by Furukawa, Junji; The Chemical Daily Co., Ltd.).

Also, regarding the acrylate oligomer CW, products that are marketed by Shin Nakamura Chemical Co., Ltd., Sartomer Japan, Inc., Daicel-Cytec Co., Ltd., Rahn A. G, and the like and meet the requirements described above can be used.

Regarding the acrylate oligomer CW, one kind thereof may be included, or two or more kinds thereof may also be included.

[Photopolymerization Initiator]

The white ink composition W used in the present invention preferably includes a photopolymerization initiator.

The photopolymerization initiator used in the present invention is not particularly limited and a known photopolymerization initiator can be used. The photopolymerization initiator that can be used in the present invention may be used singly, or two or more kinds thereof may be used in combination.

The photopolymerization initiator that can be used in the present invention is a compound that absorbs external energy by irradiation with actinic rays to generate a polymerization initiating species.

The photopolymerization initiator is preferably a photoradical polymerization initiator.

Examples of the photoradical polymerization initiator that can be used in the present invention include (a) aromatic ketone, (b) acylphosphine compound, (c) aromatic onium salt compound, (d) organic peroxide, (e) thio compound, (f) hexaarylbiimidazole compound, (g) keto oxime ester compound, (h) borate compound, (i) azinidium compound, (j) metallocene compound, (k) active ester compound, (l) compound having a carbon halogen bond, and (m) alkylamine compound. In regard to these photoradical polymerization initiators, the compounds of (a) to (m) may be used singly or in combination. In addition, for example, a plurality of kinds of (a) can be used in combination. The photoradical polymerization initiator in the present invention can be suitably used singly or in combination of two or more kinds thereof.

In regard to the details of the photoradical polymerization initiator, for example, those described in paragraphs 0090 to 0116 of JP2009-185186A may be mentioned as examples.

The white ink composition W used in the present invention preferably contains the photopolymerization initiator selected from the group consisting of an α-hydroxy ketone compound and an acylphosphine oxide compound (hereinafter, also referred to as "particular photopolymerization initiator").

In a case where the ink composition includes this particular photopolymerization initiator, the three-dimensional modeled object thus obtainable has excellent softness and tensile strength, and coloration derived from residue, decomposition products and the like of the photopolymerization initiator may be suppressed.

The acylphosphine oxide compound may be any of a monoacylphosphine oxide compound or a bisacylphosphine oxide compound; however, it is preferable that the acylphosphine oxide compound is a bisacylphosphine oxide compound.

It is preferable that the white ink composition W used in the present invention ink composition of the present invention includes one or more kinds of acylphosphine oxide compounds and one or more kinds of α-hydroxy ketone compounds. According to the above-described embodiment, the three-dimensional modeled object thus obtainable has superior softness and tensile strength.

Examples of the α-hydroxy ketone compound include 1-[4-(2-hydroxyethoxy)-phenyl]-2-hydroxy-2-methyl-1-propan-1-one, 2-hydroxy-2-methyl-1-phenylpropan-1-one, and 1-hydroxycyclohexyl phenyl ketone.

Examples of the acylphosphine oxide compound include bis(2,4,6-trimethylbenzoyl)phenylphosphine oxide, bis(2,6-dimethylbenzoyl)phenylphosphine oxide, bis(2,4,6-trimethylbenzoyl)-2-methoxyphenylphosphine oxide, bis(2,6-dimethylbenzoyl)-2-methoxyphenylphosphine oxide, bis(2,4,6-trimethylbenzoyl)-2,4-dimethoxyphenylphosphine oxide, bis(2,6-dimethylbenzoyl)-2,4-dimethoxyphenylphosphine oxide, bis(2,4,6-trimethylbenzoyl)-2,4-dipentyloxyphenylphosphine oxide, bis(2,6-dimethylbenzoyl)-2,4-dipentyloxyphenylphosphine oxide, bis(2,6-dimethoxybenzoyl)-2,4,4-trimethylpentylphenylphosphine oxide, 2,4,6-trimethylbenzoylethoxyphenylphosphine oxide, 2,6-dimethylbenzoylethoxyphenylphosphine oxide, 2,4,6-trimethylbenzoylmethoxyphenylphosphine oxide, 2,4,6-trimethylbenzoyldiphenylphosphine oxide, 2,6-dimethylbenzoylmethoxyphenylphosphine oxide, 2,4,6-trimethylbenzoyl(4-pentyloxyphenyl)phenylphosphine oxide, and 2,6-dimethylbenzoyl(4-pentyloxyphenyl)phenylphosphine oxide.

Regarding the particular photopolymerization initiator, one kind thereof may be included, or two or more kinds thereof may also be included.

The content of the particular photopolymerization initiator with respect to the total mass of the white ink composition W is preferably 1% to 20% by mass, more preferably 2% to 15% by mass, and even more preferably 5% to 15% by mass. According to the range described above, the three-dimensional modeled object thus obtainable has superior softness and tensile strength.

The white ink composition W used in the present invention may also include a compound that functions as a sensitizer (hereinafter, also simply referred to as "sensitizer"), in order to accelerate decomposition of the polymerization initiator by causing the photopolymerization initiator to absorb particular actinic energy rays.

Examples of the sensitizer include polynuclear aromatic compounds (for example, pyrene, perylene, triphenylene, and 2-ethyl-9,10-dimethoxyanthracene), xanthenes (for example, fluorescein, eosin, erythrosine, Rhodamine B, and Rose Bengal), cyanines (for example, thiacarbocyanine and oxacarbocyanine), merocyanines (for example, merocyanine and carbomerocyanine), thiazines (for example, thionine, Methylene Blue, and Toluidine Blue), acridines (for example, Acridine Orange, chloroflavine, and acriflavine), anthraquinones (for example, anthraquinone), squaryliums (for example, squarylium), coumarins (for example, 7-diethylamino-4-methyl coumarin), thioxanthones (for example, isopropylthioxanthone), and thiochromanones (for example, thiochromanone).

Among them, the sensitizer is preferably a thioxanthone compound, and more preferably isopropylthioxanthone.

Furthermore, the sensitizers may be used singly, or two or more kinds thereof may be used in combination.

The content of the sensitizer with respect to the total mass of the white ink composition W is preferably 0.1% to 5% by mass, and more preferably 0.5% to 3% by mass. According to the range described above, the ink composition has excellent curability and curing sensitivity.

<Dispersant>

The white ink composition W used in the present invention may also include a dispersant. Particularly in a case in which a pigment is used, it is preferable to contain a dispersant in order to stably disperse the white pigment in the white ink composition W. The dispersant is preferably a polymer dispersant. The term "polymer dispersant" according to the present invention refers to a dispersant having a weight-average molecular weight of 1,000 or more.

Examples of the polymer dispersant include DISPERBYK-101, DISPERBYK-102, DISPERBYK-103, DISPERBYK-106, DISPERBYK-111, DISPERBYK-161, DISPERBYK-162, DISPERBYK-163, DISPERBYK-164, DISPERBYK-166, DISPERBYK-167, DISPERBYK-168, DISPERBYK-170, DISPERBYK-171, DISPERBYK-174, and DISPERBYK-182 (manufactured by BYK Chemie GmbH); EFKA4010, EFKA4046, EFKA4080, EFKA5010, EFKA5207, EFKA5244, EFKA6745, EFKA6750, EFKA7414, EFKA745, EFKA7462, EFKA7500, EFKA7570, EFKA7575, and EFKA7580 (manufactured by EFKA Additive BV); DISPERSE AID 6, DISPERSE AID 8, DISPERSE AID 15, and DISPERSE AID 9100 (manufactured by San Nopco, Ltd.); various SOLSPERSE dispersants such as SOLSPERSE 3000, 5000, 9000, 12000, 13240, 13940, 17000, 22000, 24000, 26000, 28000, 32000, 36000, 39000, 41000, and 71000 (manufactured by Noveon, Inc.); ADEKA PLURONIC L31, F38, L42, L44, L61, L64, F68, L72, P95, F77, P84, F87, P94, L101, P103, F108, L121, and P-123 (manufactured by Adeka Corporation), IONET S-20 (manufactured by Sanyo Chemical Industries, Ltd.); DISPARLON KS-860, 873SN, and 874 (polymer dispersants), #2150 (aliphatic polyvalent carboxylic acid), and #7004 (polyether ester type) (manufactured by Kusumoto Chemicals, Ltd.).

The mass content of the dispersant with respect to the total mass of the white ink composition W is appropriately selected according to the purpose of use; however, the mass content is preferably 0.05% to 15% by mass.

[Surfactant]

Since the white ink composition W used in the present invention imparts stabilized jettability for a long period of time, it is preferable that the ink composition includes a surfactant.

Examples of the surfactant include those described in JP1987-173463A (JP-S62-173463A) and JP1987-183457A (JP-S62-183457A). Examples thereof include anionic surfactants such as dialkylsulfosuccinic acid salts, alkylnaphthalenesulfonic acid salts, and fatty acid salts; nonionic surfactants such as polyoxyethylene alkyl ethers, polyoxyethylene alkyl allyl ethers, acetylene glycols, and polyoxyethylene-polyoxypropylene block copolymers; and cationic surfactants such as alkylamine salts and quaternary ammonium salts. Furthermore, a fluorine-based surfactant (for example, an organic fluoro compound) or a silicone-based surfactant (for example, a polysiloxane compound) may also be used as the surfactant. It is preferable that the organic fluoro compound is hydrophobic. Examples of the organic fluoro compound include fluorine-based surfactants, oil-like fluorine-based compounds (for example, fluorine oil), and solid-like fluorine compound resins (for example, tetrafluoroethylene resin), and the compounds described in JP1982-9053B (JP-S57-9053B, pages 8 to 17) and JP1987-135826A (JP-S62-135826A) may be mentioned.

It is preferable that the polysiloxane compound is a modified polysiloxane compound having an organic group into some of the methyl groups of dimethylpolysiloxane. Examples of the modification include polyether modification, methylstyrene modification, alcohol modification, alkyl modification, aralkyl modification, fatty acid ester modification, epoxy modification, amine modification, amino modification, and mercapto modification; however, the modification is not particularly limited to these. These methods for modification may also be used in combination. Among them, a polyether-modified polysiloxane compound is preferred from the viewpoint of improving jetting stability in inkjetting.

Examples of the polyether-modified polysiloxane compound include, for example, SILWET L-7604, SILWET L-7607 N, SILWET FZ-2104, and SILWET FZ-2161 (manufactured by NUC Corporation); BYK306, BYK307, BYK331, BYK333, BYK347, BYK348 and the like (manufactured by BYK Chemie GmbH); KF-351A, KF-352A, KF-353, KF-354L, KF-355A, KF-615A, KF-945, KF-640, KF-642, KF-643, KF-6020, X-22-6191, X-22-4515, KF-6011, KF-6012, KF-6015, and KF-6017 (manufactured by Shin-Etsu Chemical Co., Ltd.).

Among these, preferred examples of the surfactant are silicone-based surfactants, and a polysiloxane-based surfactant is more preferred, while a polydimethylsiloxane-based surfactant is even more preferred.

The content of the surfactant in the white ink composition W used in the present invention is appropriately selected depending on the purpose of use; however, the content is preferably 0.0001% to 3% by mass with respect to the total mass of the white ink composition W.

[Other Components]

The white ink composition W used in the present invention may also include other components in addition to the various components described above, as necessary.

Examples of the other components include a polymerization inhibitor, a photopolymerization initiator other than the particular photopolymerization initiator, a co-sensitizer, an ultraviolet absorber, an antioxidant, a discoloration preventer, a conductive salt, a solvent, a polymer compound, a basic compound, a leveling additive, a matting agent, and a polyester-based resin, a polyurethane-based resin, a vinyl-based resin, an acrylic resin, a rubber-based resin, and a wax, all for regulating the film properties. These are described in JP2009-185186A, and can also be used for this invention.

The white ink composition W used in the present invention may also include a polymerizable compound other than the acrylate monomer AW, the acrylate monomer BW, and the acrylate oligomer CW (hereinafter, also referred to as "the other polymerizable compounds").

As the other polymerizable compounds, an acrylate compound is preferable.

Examples of the monomer contained in the other polymerizable compounds, other than the acrylate monomer AW, the acrylate monomer BW, and the acrylate oligomer CW include a N-vinyl compound, a vinyl ether compound, a monofunctional acrylate compound that does not correspond to the acrylate monomer AW and the acrylate monomer BW, and a bifunctional or higher-functional acrylate compound that does not correspond to the acrylate monomer AW and the acrylate monomer BW and has a molecular weight or weight-average molecular weight of less than 2,000.

Examples of the oligomer and polymer contained in the other polymerizable compounds, other than the acrylate monomer AW, the acrylate monomer BW, and the acrylate oligomer CW include a monofunctional or trifunctional or higher-functional acrylate compound having a weight-average molecular weight of less than 2,000 to 20,000, an acrylate compound having a molecular weight of more than 20,000, and the like.

In a case in which the white ink composition W contains a monomer other than the acrylate monomer AW, the acrylate monomer BW, and the acrylate oligomer CW, it is preferable that the content (mass) of the monomer with respect to the total mass of the white ink composition W is smaller than any of the content of the acrylate monomer AW, the mass content of the acrylate monomer BW, and the mass content of the acrylate oligomer CW.

[Polymerization Inhibitor]

It is preferable that the white ink composition W used in the present invention includes a polymerization inhibitor, from the viewpoint of improving storability.

In regard to inkjet recording, it is preferable that the white ink composition W is jetted out after the ink composition is heated in the range of 40° C. to 80° C. and made less viscous, and it is preferable that a polymerization inhibitor is added to the ink composition in order to prevent head clogging caused by thermal polymerization.

Examples of the polymerization inhibitor include a nitroso-based polymerization inhibitor, hydroquinone, methoxyhydroquinone, benzoquinone, p-methoxyphenol, TEMPO, TEMPOL (HO-TEMPO), cupferron Al, and a hindered amine.

Regarding the polymerization inhibitor, one kind thereof may be included, or two or more kinds thereof may be included.

The content of the polymerization inhibitor with respect to the total mass of the white ink composition W used in the present invention is preferably 0.001% to 1.5% by mass, more preferably 0.01% to 1.0% by mass, and even more preferably 0.05% to 0.8% by mass. According to the range described above, polymerization during preparation and during storage of the white ink composition W can be suppressed, and clogging of inkjet nozzles can be prevented.

[Physical Properties of White Ink Composition W]

The viscosity at 25° C. of the white ink composition W used in the present invention is preferably 20 to 150 mPa·s, and more preferably 40 to 100 mPa·s. In a case where the viscosity is in the range described above, excellent jettability and moldability are obtained.

The viscosity of the white ink composition W and the like used in the present invention is the viscosity obtained by maintaining the liquid temperature at 25° C. and measuring the value with a digital viscometer (DV-I PRIME, manufactured by Brookfield Engineering Laboratories, Inc.).

Furthermore, the surface tension at 25° C. of the white ink composition W used in the present invention is preferably 20 to 40 mN/m, and more preferably 20 to 30 mN/m. In a case where the surface tension is in the range described above, excellent jettability and moldability are obtained.

The surface tension of the white ink composition W and the like used in the present invention is a value obtained by maintaining the liquid temperature at 25° C. and measuring the value using a surface tension meter (surface tension meter CBVP-Z, manufactured by Kyowa Interface Science Co., Ltd.).

<Color Ink Composition C>

The actinic ray-curable-type inkjet ink set for three-dimensional printing of the present invention contains the color ink composition C having the following composition.

The color ink composition C contains a colorant, an acrylate monomer AC which forms a homopolymer having a glass transition temperature of 25° C. to 120° C., and an acrylate monomer BC which forms a homopolymer having a glass transition temperature of −60° C. or higher and lower than 25° C., in which, with respect to a total mass of the color ink composition C, a content of the acrylate monomer AC is 5% by mass or more and less than 50% by mass and a content of the acrylate monomer BC is 20% by mass or more and less than 80% by mass.

The content of the acrylate monomer AC in the color ink composition C is 5% by mass or more and less than 50% by mass, and is preferably 8% by mass or more and less than 42% by mass with respect to a total mass of the color ink composition C.

The content of the acrylate monomer BC in the color ink composition C is 20% by mass or more and less than 80% by mass, and is preferably 30% by mass or more and less than 70% by mass with respect to a total mass of the color ink composition C.

The acrylate monomer AC and the acrylate monomer BC are synonymous with the acrylate monomer AW and the acrylate monomer BW, respectively, and therefore a preferred embodiment thereof is also similar.

<Color Ink Composition C1>

In addition, the actinic ray-curable-type inkjet ink set for three-dimensional printing of the present invention preferably contains the color ink composition C1 having the following composition as a color ink composition C.

The color ink composition C1 further contains a bifunctional acrylate oligomer CC having a weight-average molecular weight of 2,000 to 20,000 (hereinafter, also simply referred to as "acrylate oligomer CC"), in which, with respect to a total mass of the color ink composition C1, a content of the acrylate monomer AC in the color ink composition C1 is 5% by mass or more and less than 40% by mass, a content of the acrylate monomer BC in the color ink composition C1 is 30% by mass or more and less than 80% by mass, and a content of the acrylate oligomer CC in the color ink composition C1 is 5% by mass or more and less than 20% by mass.

The content of the acrylate monomer AC in the color ink composition C1 is 5% by mass or more and less than 40% by mass, and is preferably 10% by mass or more and less than 30% by mass with respect to a total mass of the color ink composition C1.

The content of the acrylate monomer BC in the color ink composition C1 is 30% by mass or more and less than 80% by mass, and is preferably 40% by mass or more and less than 70% by mass with respect to a total mass of the color ink composition C1.

The content of the acrylate oligomer CC in the color ink composition C1 is 5% by mass or more and less than 20% by mass, and is preferably 8% by mass or more and less than 17% by mass with respect to a total mass of the color ink composition C1.

The acrylate oligomer CC is synonymous with the acrylate oligomer CW, and therefore a preferred embodiment thereof is also similar.

The ink set of the present invention contains a color ink composition C at least other than white, as a color ink composition C.

In addition, the ink set of the present invention preferably contains a plurality of the color ink composition C. For example, in order to perform full-color printing, the ink set is preferably an ink set in which four color ink compositions C added with inks of three of the subtractive primary colors, yellow, magenta, and cyan, and black ink are combined.

The color ink composition C and/or the color ink composition C1 preferably contains the colorant, the photopolymerization initiator, the dispersant, the surfactant, the other components, and the polymerization inhibitor. The photopolymerization initiator, the dispersant, the surfactant, the other components, and the polymerization inhibitor are synonymous with those explained as the components contained in the white ink composition W, and therefore a preferred embodiment thereof is also similar.

Hereinafter, the colorant contained in the color ink composition C and/or the color ink composition C1 will be explained.

[Colorant]

The color ink composition C used in the present invention may also include a colorant, as necessary.

The colorant that can be used herein is not particularly limited, and various known pigments and dyes can be appropriately selected and used according to the use. Among them, it is preferable that the colorant is a pigment, from the viewpoint of having particularly excellent light resistance.

The pigment that is preferably used in the present invention will be discussed.

The pigment is not particularly limited, and all organic pigments and inorganic pigments that are generally commercially available, resin particles dyed with a dye, and the like can also be used. Furthermore, a commercially available pigment dispersion, a surface-treated pigment, for example, a pigment dispersed in an insoluble resin or the like as a dispersing medium, or a resin grafted to the surface of a pigment, and the like can also be used, as long as the effects of the present invention are not impaired.

Examples of these pigments include the pigments described in Ito, Seijiro, ed., "Ganryo no Men (Dictionary of Pigments)" (year 2000); W. Herbst, K. Hunger, "Industrial Organic Pigments", JP2002-12607A, JP2002-188025A, JP2003-26978A, and JP2003-342503A.

Specific examples of the organic pigments and inorganic pigments that can be used for the present invention include, for example, as pigments exhibiting yellow color, monoazo pigments such as C.I. Pigment Yellow 1 (First Yellow G or the like), and C.I. Pigment Yellow 74; disazo pigments such as C.I. Pigment Yellow 12 (Disazi Yellow AAA or the like), and C.I. Pigment Yellow 17; bibenzidine-based azo pigments such as C.I. Pigment Yellow 180; azo lake pigments such as C.I. Pigment Yellow 100 (Tartrazine Yellow Lake or the like); condensed azo pigments such as C.I. Pigment Yellow 95 (Condensed Azo Yellow GR or the like); acidic dye lake pigments such as C.I. Pigment Yellow 115 (Quinoline Yellow Lake or the like); basic dye lake pigments such as C.I. Pigment Yellow 18 (Thioflavine Lake or the like); anthraquinone-based pigments such as flavanthrone yellow (Y-24); isoindolinone pigments such as isoindolinone yellow 3RLT (Y-110); quinophthalone pigments such as quinophthalone yellow (Y-138); isoindoline pigments such as isoindoline yellow (Y-139); nitroso pigments such as C.I. Pigment Yellow 153 (Nickel Nitroso Yellow or the like); and metal complex salt azomethine pigments such as C.I. Pigment Yellow 117 (Copper Azomethine Yellow or the like).

Examples of pigments exhibiting red or magenta color include monoazo-based pigments such as C.I. Pigment Red 3 (Toluidine Red or the like); disazo pigments such as C.I. Pigment Red 38 (Pyrazolone Red B or the like); azo lake pigments such as C.I. Pigment Red 53:1 (Lake Red C or the like) and C.I. Pigment Red 57:1 (Brilliant Carmine 6B); condensed azo pigments such as C.I. Pigment Red 144 (Condensed Azo Red BR or the like); acidic dye lake pigments such as C.I. Pigment Red 174 (Phloxine B Lake or the like); basic pigment lake pigments such as C.I. Pigment Red 81 (Rhodamine 6G' Lake or the like); anthraquinone-based pigments such as C.I. Pigment Red 177 (Dianthraquinonyl Red or the like); thioindigo pigments such as C.I. Pigment Red 88 (Thioindigo Bordeaux or the like); perinone pigments such as C.I. Pigment Red 194 (Perinone Red or the like); perylene pigments such as C.I. Pigment Red 149 (Perylene Magenta or the like); quinacridone pigments such as C.I. Pigment Violet 19 (unsubstituted quinacridone) and C.I. Pigment Red 122 (Quinacridone Magenta or the like); isoindolinone pigments such as C.I. Pigment Red 180 (Isoindolinone Red 2BLT or the like); and alizarin lake pigments such as C.I. Pigment Red 83 (madder lake or the like).

Examples of pigments exhibiting blue or cyan color include disazo-based pigments such as C.I. Pigment Blue 25 (Dianisidine Blue or the like); phthalocyanine pigments such as C.I. Pigment Blue 15 (Phthalocyanine Blue or the like); acidic dye lake pigments such as C.I. Pigment Blue 24 (Peacock Blue lake or the like); basic dye lake pigments such as C.I. Pigment Blue 1 (Victoria Pure Blue BO lake or the like); anthraquinone-based pigments such as C.I. Pigment Blue 60 (Indanthrone Blue or the like); and alkali blue pigments such as C.I. Pigment Blue 18 (Alkali Blue V-5:1).

Examples of pigments exhibiting green color include phthalocyanine pigments such as C.I. Pigment Green 7 (Phthalocyanine Green) and C.I. Pigment Green 36 (Phthalocyanine Green); and azo metal complex pigments such as C.I. Pigment Green 8 (Nitroso Green).

Examples of pigments exhibiting orange color include isoindoline-based pigments such as C.I. Pigment Orange 66 (Isoindoline Orange); and anthraquinone-based pigments such as C.I. Pigment Orange 51 (Dichloropyranthrone Orange).

Examples of the pigment exhibiting black color include carbon black, titanium black, and aniline black.

Specific examples of white pigments that can be utilized include basic lead carbonate ($2PbCO_3Pb(OH)_2$, so-called Silver White), zinc oxide (ZnO, so-called Zinc White), titanium oxide ($TiO_2$, so-called Titanium White), and strontium titanate ($SrTiO_3$, so-called Titanium Strontium White).

Here, titanium oxide has a small specific weight and a large refractive index, and is chemically and physically stable, compared to other white pigments. Therefore, titanium oxide has high covering power or coloring power as a pigment, and also has excellent durability against acid, alkali, and other environments. Therefore, it is preferable to utilize titanium oxide as a white pigment. Obviously, other white pigments (may be pigments other than those white pigments listed above) may also be used, as necessary.

For the dispersion of the colorant, for example, a dispersion apparatus such as a ball mill, a sand mill, an attritor, a roll mill, a jet mill, a homogenizer, a paint shaker, a kneader, an agitator, a Henschel mixer, a colloid mill, an ultrasonic homogenizer, a pearl mill, or a wet-type jet mill may be used.

In a case where dispersion of the colorant is performed, the dispersant can be added.

Furthermore, on the occasion of adding a colorant, if necessary, it is also possible to use a synergist corresponding to various colorants, as a dispersing aid. It is preferable that the dispersing aid is added in an amount of 1 to 50 parts by mass with respect to 100 parts by mass of the colorant.

The colorant may be added directly together with various components on the occasion of preparing the color ink composition C. Also, for the reason of enhancing dispersibility, the colorant may be added to a dispersing medium such as a solvent or a monomer in advance, uniformly dispersing or dissolving the colorant therein, and then the resultant may be mixed into the ink composition.

Regarding the dispersing medium for general components such as a colorant, a solvent may be added, or the above-mentioned polymerizable compound, which is a low molecular weight component, may also be used as a dispersing medium, without solvent. However, in order to cure the color ink composition C by irradiating the ink composition with actinic rays, it is preferable that no solvent is used. This is because in a case where there is residual solvent in the cured ink layer formed from the cured color ink composition C, solvent resistance may be deteriorated, or there may be a problem with the volatile organic compound (VOC) of the residual solvent. From this point of view, a monomer is used as a dispersing medium, and above all, it is preferable to select a monomer having the lowest viscosity, from the viewpoint of enhancing dispersion suitability or handleability of the ink composition.

The average particle size of the colorant used herein is preferably 0.01 to 0.4 µm, and more preferably 0.02 to 0.2 µm, since excellent color developability is obtained as the particles are finer. Selection of the colorant, the dispersant and the dispersing medium, and the conditions for dispersing and conditions for filtration are set such that the maximum particle size is preferably set to be 3 µm or less, and more preferably 1 µm or less. Through this management of particle size, clogging of the head nozzle can be suppressed, and preservation stability, transparency and curing sensitivity of the color ink composition C can be maintained. According to the present invention, by using the above-mentioned dispersant having excellent dispersibility and stability, a uniform and stable dispersion is obtained even in a case in which a particulate colorant is used.

The particle size of the colorant can be measured by a known measurement method. Specifically, the particle size can be measured by a centrifugal sedimentation light transmission method, an X-ray transmission method, a laser diffraction/scattering method, or a dynamic light scattering method. According to the present invention, a value obtained by measurement using a laser diffraction/scattering method is employed.

In a case in which the ink includes a colorant, the content of the colorant with respect to the total amount of the color ink composition C is appropriately selected according to the color and the purpose of use; however, from the viewpoints of colorability and preservation stability, the mass content is preferably 0.01% to 40% by mass, more preferably 0.1% to 30% by mass, and particularly preferably 0.2% to 20% by mass.

<Ink Composition for Support Material>

The actinic ray-curable-type inkjet ink set for three-dimensional printing of the present invention preferably further includes the ink composition for a support material having the following composition.

The ink composition for a support material contains a monofunctional acrylate compound, a polymerization initiator, and a water-soluble non-curing component, in which, with respect to a total mass of the ink composition for a support material, a content of a polyfunctional acrylate compound is 5% by mass or less, and a colorant is not substantially contained in the ink composition for a support material.

In regard to the "ink composition for a support material", there is a case where the white ink composition W and the color ink composition C contained in the ink set of the present invention are referred to as an "ink composition for modeling material".

The "modeling material" refers to a material that becomes an intended modeled object by being cured. The "support material" refers to a material that is printed at the periphery or in the interior of a modeling material during a three-dimensional printing step and supports the modeling material, and that is removed after modeling has been completed.

The ink composition for a support material is suitably used as a support material supporting an ink layer by being jetted out as needed at the periphery of the position at which the ink composition for a modeling material has been jetted out during three-dimensional printing.

In the present invention, the phrase "a colorant is not substantially contained" means that the content of the colorant is 0.1% by mass or less with respect to a total mass of the ink composition for a support material. The content of the colorant is preferably 0.01% by mass or less, and it is more preferable that the colorant is not contained at all.

The ink composition for a support material contained in the ink set of the present invention is preferably such that the support material obtained by curing the ink composition can be easily removed, and it is more preferable that the support material obtained by curing the ink composition is a water-soluble cured product, and/or a crushable cured product having lower hardness than a cured modeling material.

It is preferable that the ink composition for a support material and the ink composition for a modeling material are mutually incompatible compositions. According to the above-described embodiment, excellent moldability is obtained, and these two kinds of compositions may be cured simultaneously by irradiating the compositions with actinic rays.

[Monofunctional Acrylate Compound]

The ink composition for a support material used in the present invention contains the monofunctional acrylate compound.

As the monofunctional acrylate compound, a water-soluble monofunctional acrylate compound is preferable, and a monofunctional acrylate compound having one or more hydroxy groups is more preferable.

Examples of the monofunctional acrylate compound having one or more hydroxyl groups include hydroxyethyl acrylate, hydroxypropyl acrylate, 4-hydroxybutyl acrylate, polyethylene glycol monoacrylate, methoxy polyethylene glycol monoacrylate, polypropylene glycol monoacrylate, methoxy polypropylene glycol monoacrylate, monoacrylate of a polyethylene glycol/polypropylene glycol block polymer, hydroxyethyl methacrylate, hydroxypropyl methacrylate, 4-hydroxybutyl methacrylate, polyethylene glycol monomethacrylate, methoxy polyethylene glycol monomethacrylate, polypropylene glycol monomethacrylate, methoxy polypropylene glycol monomethacrylate, and monomethacrylate of a polyethylene glycol/polypropylene glycol block polymer.

Among these, it is preferable that the monofunctional acrylate compound having one or more hydroxyl groups includes a compound selected from the group consisting of polyethylene glycol monoacrylate, 4-hydroxybutyl acrylate, 2-hydroxyethyl acrylate, and 2-hydroxypropyl acrylate.

Regarding the monofunctional acrylate compound, one kind thereof may be included, or two or more kinds thereof may be included.

The content of the monofunctional acrylate compound with respect to the total mass of the ink composition for a support material is preferably 1% to 95% by mass, more preferably 3% to 50% by mass, and even more preferably 5% to 30% by mass. In a case where the total mass content is in the range described above, the occurrence of failure of the three-dimensional modeled object at the time of removing the support material thus obtained can be suppressed.

[Polymerization Initiator]

The ink composition for a support material used in the present invention includes the polymerization initiator.

The photopolymerization initiator is preferably a photo-radical polymerization initiator.

Examples of the photopolymerization initiator include (a) aromatic ketone, (b) acylphosphine oxide compound, (c) aromatic onium salt compound, (d) organic peroxide, (e) thio compound, (f) hexaarylbiimidazole compound, (g) keto oxime ester compound, (h) borate compound, (i) azinidium compound, (j) metallocene compound, (k) active ester compound, (l) compound having a carbon halogen bond, and (m) alkylamine compound. In regard to these radical polymerization initiators, the compounds of (a) to (m) may be used singly or in combination. In regard to the details of the polymerization initiator, for example, those described in paragraphs 0090 to 0116 of JP2009-185186A may be mentioned as examples.

The photopolymerization initiators may be used singly, or two or more kinds thereof may be used in combination.

It is preferable that the ink composition for a support material includes two or more kinds of photopolymerization initiators; it is more preferable that the ink composition includes 3 to 5 kinds thereof and it is even more preferable that the ink composition includes 3 kinds thereof.

Preferred examples of the photopolymerization initiator include an acylphosphine oxide compound, an α-hydroxy ketone compound, and/or an α-amino ketone compound. Among them, it is particularly preferable that the ink composition for a support material includes an acylphosphine oxide compound and an α-hydroxy ketone compound.

Regarding the acylphosphine oxide compound and the α-hydroxy ketone compound, known compounds can be used, and preferred examples include the compounds described above as particular photopolymerization initiators.

Regarding the α-amino ketone compound, known compounds can be used, and specifically, preferred examples thereof include 2-methyl-1-phenyl-2-morpholinopropan-1-one, 2-methyl-1-[4-(hexyl)phenyl]-2-morpholinopropan-1-one, 2-ethyl-2-dimethyl amino-1-(4-morpholinophenyl)butan-1-one, 2-benzyl-2-dimethylamino-1-(4-morpholinophenyl)butan-1-one, 2-methyl-1-(4-methylthiophenyl)-2-morpholiopropan-1-one), and 2-(dimethylamino)-2-[(4-methylphenyl)methyl]-1-[4-(4-morpholinyl)phenyl]-1-butanone.

Regarding the photopolymerization initiator used for the ink composition for a support material, it is preferable that the ink composition includes a water-soluble photopolymerization initiator.

For example, 1-[4-(2-hydroxyethoxy)phenyl]-2-hydroxy-2-methyl-1-propan-1-one is a water-soluble photopolymerization initiator, and this is a preferred example.

The mass content of the photopolymerization initiator with respect to the total amount of the ink composition for a support material is preferably 1% to 20% by mass, more preferably 2% to 15% by mass, and even more preferably 5% to 10% by mass. In a case where the mass content is in the range described above, excellent curability is obtained, and the occurrence of failure of the three-dimensional modeled object at the time of removing the support material thus obtained can be suppressed.

[Water-Soluble Non-Curing Component]

The ink composition for a support material used in the present invention contains a water-soluble non-curing component.

As the water-soluble non-curing component, polyethylene glycol and/or polypropylene glycol is preferable.

—Polyethylene Glycol and/or Polypropylene Glycol—

It is preferable that the ink composition for a support material used for the present invention includes, as the water-soluble non-curing component, polyethylene glycol and/or polypropylene glycol; it is more preferable that the ink composition includes two or more kinds of polyethylene glycol and/or polypropylene glycol; and it is even more preferable that the ink composition includes one or more kinds of polyethylene glycol and one or more kinds of polypropylene glycol. In a case where the above-described embodiment is employed, the support material thus obtainable has excellent removability, and the occurrence of failure of the three-dimensional modeled object at the time of removing the support material thus obtained can be suppressed.

Furthermore, the number average molecular weight Mn of the polyethylene glycol and polypropylene glycol is preferably 100 to 5,000, and more preferably 150 to 3,000. According to the above-described embodiment, excellent moldability is obtained, and the occurrence of failure of the three-dimensional modeled object at the time of removing the support material thus obtained can be suppressed.

Regarding the polyethylene glycol, one kind thereof may be included, or two or more kinds thereof may be included. Regarding the polypropylene glycol, one kind thereof may be included, or two or more kinds thereof may be included. The ink composition may also include both polyethylene glycol and polypropylene glycol.

The total mass content of polyethylene glycol and polypropylene glycol with respect to the total amount of the ink composition for a support material is preferably 10% to 98% by mass, more preferably 20% to 95% by mass, even more preferably 30% to 90% by mass, and particularly preferably 40% to 80% by mass. In a case where the total mass content is in the range described above, excellent moldability is obtained, and the occurrence of failure of the three-dimensional modeled object at the time of removing the support material thus obtained can be suppressed.

[Other Components]

The ink composition for a support material used for the present invention may also include other components as necessary, in addition to the various components described above.

Examples of the other components include a polymerization inhibitor, a co-sensitizer, an ultraviolet absorber, an antioxidant, a discoloration preventer, a conductive salt, a solvent, water, a polymer compound, a basic compound, a leveling additive, a matting agent, and a polyester-based resin, a polyurethane-based resin, a vinyl-based resin, an acrylic resin, a rubber-based resin, and a wax, all intended for regulating the film properties. These are described in JP2009-185186A, and can also be used for this invention.

The ink composition for a support material may also include a monomer other than the monofunctional acrylate compound.

In a case in which the ink composition includes a monomer other than the monofunctional acrylate compound, it is preferable that the mass content of the monomer with respect to the total amount of the ink composition for a support material is smaller than the total mass content of the monofunctional acrylate compound. It is preferable that the mass content of the monomer is 5% by mass or less, more preferably 2% by mass or less, and even more preferably 1% by mass or less, with respect to the total amount of the ink composition for a support material, and it is particularly preferable that the ink composition does not include such a monomer.

From the viewpoint of increasing storability, it is preferable that the ink composition for a support material used for the present invention includes a polymerization inhibitor.

Regarding the polymerization inhibitor, those compounds described above may be preferably used.

Regarding the polymerization inhibitor, one kind thereof may be included, or two or more kinds thereof may be included.

The mass content of the polymerization inhibitor with respect to the total amount of the ink composition for a support material is preferably 0.001% to 1.5% by mass, more preferably 0.01% to 1.0% by mass, and even more preferably 0.05% to 0.8% by mass. In a case where the mass content is in the range described above, polymerization at the time of preparation and at the time of storage of the ink composition for a support material can be suppressed, and clogging of inkjet nozzles can be prevented.

[Physical Properties of Ink Composition for Support Material]

The viscosity at 25° C. of the ink composition for a support material is preferably 20% to 150 mPa·s, and more preferably 40 to 100 mPa·s. In a case where the viscosity is in the range described above, excellent jettability and moldability are obtained.

The surface tension at 25° C. of the ink composition for a support material is preferably 20 to 40 mN/m, and more preferably 25 to 35 mN/m. In a case where the surface tension is in the range described above, excellent jettability and moldability are obtained.

There are no particular limitations on the method for producing the white ink composition W and the color ink composition C contained in the ink set of the present invention and the ink composition for a support material, and the ink compositions can be produced by mixing various components by known methods.

(Three-Dimensional Printing Method)

The three-dimensional printing method of the present invention is characterized to include a printing step of jetting out, a plurality of times, each of the white ink composition W and the color ink composition C contained in the inkjet ink set for three-dimensional printing according to the present invention using an inkjet head so as to form a color layer on a white modeled object based on cross-sectional information of a three-dimensional modeled object.

The printing step is preferably a step which includes a jetting step of jetting out the white ink composition W and/or the color ink composition C contained in the inkjet ink set for three-dimensional printing according to the present invention so as to form an ink layer based on the cross-sectional information of a three-dimensional modeled object; and a curing step of curing the ink layer with actinic rays, and in which the jetting step and the curing step are repeatedly performed for 500 times or more.

The three-dimensional printing method of the present invention preferably includes a heating step of heating the ink composition contained in the inkjet ink set for three-dimensional printing according to the present invention at a temperature within the range of 40° C. to 80° C., before the jetting step.

Furthermore, the three-dimensional printing method of the present invention is preferably a three-dimensional printing method according to a stereolithography method.

In the three-dimensional printing method of the present invention, it is preferable that the ink composition for a support material having the above composition is jetted out a plurality of times in the printing step.

The ink composition for a support material contains a monofunctional acrylate compound, a polymerization initiator, and a water-soluble non-curing component, in which, with respect to the total mass of the ink composition for a support material, a content of a polyfunctional acrylate compound is 5% by mass or less, and a colorant is not substantially contained in the ink composition for a support material.

The ink composition for a support material is synonymous with the ink composition for a support material contained in the ink set of the present invention, and therefore a preferred embodiment thereof is also similar.

In the three-dimensional printing method of the present invention, it is preferable that at least one ink composition selected from the group consisting of the white ink composition W, the color ink composition C, and the ink composition for a support material having the above composition is jetted out in the jetting step.

The three-dimensional printing method of the present invention can be performed by a known inkjet jetting apparatus or a known inkjet jetting means, and with any of these, jetting of each ink composition in the jetting step of the three-dimensional printing method of the present invention can be carried out.

<Heating Step>

It is preferable that the three-dimensional printing method of the present invention includes a heating step of heating an ink composition contained in the inkjet ink set for three-dimensional printing according to the present invention at a temperature within the range of 40° C. to 80° C.

There are no particular limitations on the heating means of the ink composition, and any known heating means can be used.

Examples of the heating means include a heating means performing thermal insulation and heating of, from an ink composition supply tank to an inkjet head portion may be mentioned.

The method for temperature control is not particularly limited; however, it is preferable to control heating according to the flow rate of the ink composition and the environment temperature by providing a plurality of temperature sensors at various sites of the piping. The temperature sensors can be installed in the vicinity of an ink composition supply tank and in the vicinity of an inkjet head nozzle. It is also preferable that the head unit to be heated is thermally blocked or insulated so that the main body of the apparatus would not be affected by temperature from external air. In order to shorten the starting-up time of the inkjet jetting apparatus that requires heating, or in order to reduce the loss of heat energy, it is preferable to make the heat capacity of the entire heating unit small while achieving thermal insulation from other sites.

Furthermore, since an actinic ray-curable-type inkjet ink composition has higher viscosity than an aqueous ink composition that is generally used for inkjet jetting, the viscosity variation caused by temperature variation at the time of jetting is large. Since the viscosity variation of an ink composition significantly affects the change in the liquid droplet size and the change in the liquid droplet jetting speed and further causes deterioration in image quality, it is preferable to maintain the temperature of the ink composition at the time of jetting constant as far as possible. Therefore, according to the present invention, it is adequate to set the controlled temperature range of the ink composition to be preferably ±5° C. from the preset temperature, more preferably ±2° C. from the preset temperature, and even more preferably ±1° C. from the preset temperature.

In regard to the three-dimensional printing method of the present invention, the aforementioned heating step may be carried out a plurality of times, or the heating means may be performed once, and the ink composition may be maintained at a temperature within the range of 40° C. to 80° C.

In regard to the three-dimensional printing method of the present invention, since it is preferable that the temperature of the ink composition at the time of being jetted from the inkjet head in the jetting step that will be described below is 40° C. to 80° C., it is preferable to perform a heating step again, or to maintain the temperature, so that the ink composition is maintained at a temperature in the range of 40° C. to 80° C.

<Jetting Step>

It is preferable that the three-dimensional printing method of the present invention includes a jetting step of jetting out the white ink composition W and/or the color ink composition C contained in the inkjet ink set for three-dimensional printing according to the present invention from an inkjet head so as to form a color layer on a white modeled object based on cross-sectional information of a three-dimensional modeled object.

There are no particular limitations on the cross-sectional data of a three-dimensional modeled object used for the jetting step, and cross-sectional information corresponding to the three-dimensional shape of a desired three-dimensional modeled object may be produced in any format adapted for the apparatus to be used. In regard to a method for producing cross-sectional information of a three-dimensional modeled object, for example, there may be mentioned a method of using three-dimensional CAD data of an object to be modeled; converting the CAD data to, for example, three-dimensional stereo lithography (STL) data as the data for three-dimensional modeling; and producing data for each cross-sectional body (layer) that has been sliced at a pitch (layer thickness) corresponding to the thickness of one ink layer in any single direction (for example, direction of height), from the three-dimensional STL data. This pitch can be appropriately determined in accordance with the ink composition to be used, desired accuracy, or the like. Furthermore, the data of each cross-sectional body (layer) preferably has the color information (chromatic data) of various parts, as necessary.

Furthermore, it is also possible to utilize the data and texture of a three-dimensional colored shape measured with a three-dimensional shape input device.

In regard to the jetting step, in a case in which the ink composition for a support material is used in addition to the ink composition for a modeling material such as the white ink composition W and the color ink composition C contained in the ink set of the present invention, it is needless to say that the "cross-sectional information of a three-dimensional modeled object" includes not only the cross-sectional information of the three-dimensional modeled object itself, but also the cross-sectional information of a support material provided in a case of molding the three-dimensional modeled object.

During the jetting step, as described above, it is possible that at least one ink composition selected from the group consisting of the white ink composition W, the color ink composition C, or the ink composition for a support material is jetted out from an inkjet head so as to form an ink layer made from each ink composition using a known inkjet jetting apparatus or an inkjet jetting means.

In the jetting step, a color layer is formed on a white modeled object.

The color layer may be an ink layer formed from the color ink composition C, and is preferably a layer formed by polymerizing the color ink composition C by the curing step to be described later. A layer formed by polymerizing the white ink composition W by the curing step to be described later is also referred to as a white layer.

The white modeled object may be a three-dimensional modeled object molded from the white ink composition W, and is preferably a three-dimensional modeled object molded by laminating the white layer.

In addition, the phrase "on a white modeled object" means a layer is present on a surface of the white modeled object, and it is preferable that at least a part of the color layer is in contact with the white modeled object. In addition, the color layer is preferably located at a position visible from a surface of the three-dimensional modeled object manufactured by the three-dimensional printing method, and is more preferably exposed on the surface of the three-dimensional modeled object.

That is, it is preferable that the three-dimensional printing method includes at least a step of jetting out the white ink composition W or the color ink composition C on a surface of the white layer, as a jetting step.

In a case where the ink composition for a support material is used in the jetting step, the ink layer that is formed of the ink composition for a support material (hereinafter, also referred to as "support layer") may be formed into any shape. For example, an ink layer may be formed of an ink composition for a support material such that a support material is formed into the minimum size that is necessary in a case of molding the three-dimensional modeled object, or an ink layer may be formed of the ink composition for a support material with large margins so that a sufficient support material is formed at the periphery or in the interior of the three-dimensional modeled object.

Also, in a case where a support material is not needed for the formation of a three-dimensional modeled object having a desired shape, an ink composition for a support material may not be used.

The thickness of the ink layer in connection with the jetting step is not particularly limited, and as described above, the thickness may be determined in accordance with the ink composition to be used, desired accuracy, or the like. However, the thickness is preferably 0.1 to 200 μm, more preferably 1 to 150 μm, and even more preferably 10 to 100 μm.

The resolution of jetting of the ink composition by means of an inkjet head in connection the jetting step is not particularly limited, and the resolution can be appropriately selected in accordance with the accuracy of the desired three-dimensional modeled object, or the accuracy of the cross-sectional information of the three-dimensional modeled object.

The ink layer that is formed in the first jetting step according to the three-dimensional printing method of the present invention may be formed directly on the base of the three-dimensional modeling apparatus used or on a modeling table, or the ink layer may be formed on any substrate, support or article that is separately prepared. Alternatively, the ink layer may also be formed on one layer or a plurality of layers of an ink composition for a support material provided by a method other than the method used in the jetting step.

It is preferable that the ink layers formed in the second and subsequent jetting steps in the three-dimensional printing method of the present invention are formed on the ink layer that has already been formed.

<Curing Step>

It is preferable that the three-dimensional printing method of the present invention includes a curing step of curing the ink layers formed by the jetting step with actinic rays.

Examples of the actinic rays that can be used for the curing step include α-rays, γ-rays, an electron beam, X-rays, ultraviolet radiation, visible light, and infrared light. The peak wavelength of the actinic rays may vary depending on the absorption characteristics of the photopolymerization initiator or the sensitizer; however, for example, the peak wavelength is preferably 200 to 600 nm, more preferably 300 to 450 nm, and even more preferably 320 to 420 nm, and it is particularly preferable that the actinic ray is ultraviolet radiation having a peak wavelength in the range of 340 to 400 nm.

The plane illuminance of exposure of the actinic rays for the curing step is preferably 10 to 4,000 mW/cm$^2$, and more preferably 20 to 2,500 mW/cm$^2$.

Regarding the actinic ray source as curing means, a mercury lamp, a gas laser or solid laser or the like is mainly utilized, and regarding the light source used for the curing of an ultraviolet-curable-type inkjet ink composition, a mercury lamp and a metal halide lamp are widely known. However, currently, from the viewpoint of environmental protection, removal of mercury is strongly desirable, and replacement with GaN-based semiconductor ultraviolet light emitting devices is very useful industrially and environmentally. Furthermore, LED (UV-LED) and LD (UV-LD) are small-sized, have long service lives, and are highly efficient and less expensive, and are therefore expected as potential light sources for photocurable-type inkjetting.

It is also possible to use a light emitting diode (LED) and a laser diode (LD) as actinic ray sources. Particularly, in a case in which an ultraviolet light source is needed, an ultraviolet LED and an ultraviolet LD can be used. For example, Nichia Corporation is marketing a violet LED having a main emission spectrum in the wavelength range between 365 nm and 420 nm. Furthermore, in a case in which much shorter wavelengths are needed, U.S. Pat. No. 6,084,250B discloses a LED that can emit actinic rays centered between 300 nm to 370 nm. Other ultraviolet LED's are also available, and radiation of other ultraviolet bands may also be radiated. A particularly preferred actinic ray source in the present invention is a UV-LED, and a particularly preferred actinic ray source is a UV-LED having a peak wavelength at 340 to 400 nm.

The maximum illuminance of the LED on the ink layer is preferably 10 to 2,000 mW/cm$^2$, more preferably 20 to 1,000 mW/cm$^2$, and particularly preferably 50 to 800 mW/cm$^2$.

In the curing step, it is adequate that the ink layer is irradiated with actinic rays preferably for 0.01 to 120 seconds, and more preferably for 0.1 to 90 seconds.

According to the three-dimensional printing method of the present invention, the jetting step and the curing step are repeatedly carried out a plurality of times. As one set of the jetting step and the curing step is repeated, a three-dimensional modeled object is molded layer by layer based on the cross-sectional information. The thickness of the molded object is preferably 1 mm or more, and more preferably 1 cm or more. Therefore, in regard to the three-dimensional printing method of the present invention, the jetting step and the curing step are preferably performed repeatedly for 500 times or more, more preferably performed repeatedly for 1,000 times or more, and particularly preferably performed repeatedly for 3,000 times or more.

In addition, in a case where the jetting step includes a jetting step in which while the white ink composition W is not jetted out, only the color ink composition C, or the color ink composition C and the ink composition for a support material are jetted out, it is preferable that the above step and the curing step are repeatedly continuously carried out for 2 times or more so as to form two or more consecutive color layers.

While the jetting step and the curing step are repeated, the heating step may also be carried out again, as necessary.

Furthermore, as necessary, the three-dimensional modeling method may include a smoothing step of smoothing the surface of the ink layer using a roller or the like, between the jetting step and the curing step.

In a case in which an ink composition for a support material is used in combination as the ink composition, the three-dimensional printing method of the present invention includes a removal step of removing the support material formed as the ink composition for a support material has cured, from the three-dimensional modeled object thus obtained.

There are no particular limitations on the method for removing the support material, and the support material may be removed physically through pulverization or the like, or may be removed chemically through dissolution or the like.

For example, in a case where the support material is a crushable cured product having lower hardness compared to the modeling material, it is preferable to remove the support material physically through pulverization or the like. Also, in a case in which the support material is a water-soluble cured product, it is preferable to remove the support material by bringing the support material into contact with an aqueous liquid.

The three-dimensional printing method of the present invention may also include other known steps, as necessary.

If necessary, the three-dimensional printing method of the present invention may also include a post-treatment step such as cleaning, heat treatment, permeation of a resin or a wax, or polishing, for the three-dimensional modeled object thus obtained. The cleaning may involve elimination of the residue or the like of the support material remaining in the gaps by blowing or brushing the three-dimensional modeled object. The heat treatment may be carried out in accordance with the composition of the ink composition for a modeling material used or the like, in order to increase strength and durability of the three-dimensional modeled object. The permeation of wax reduces the void ratio, makes the three-dimensional modeled object water-resistant, can facilitate finishing by polishing, and can improve surface glossiness. The finishing by polishing can improve surface smoothness, and can improve the feeling of touch, glossiness, and the like.

The three-dimensional printing method of the present invention may also include a step of coloring the surface of the three-dimensional modeled object thus obtained, as necessary.

FIG. 1 is a schematic diagram showing an example of three-dimensional printing using the three-dimensional printing method of the present invention. First, the ink composition for a support material is jetted on a base 1 from an inkjet head 4a, and the ink composition for a support material is cured using an exposure light source 5 so as to form a support layer 4. Next, the white ink composition W and the color ink composition C are jetted from inkjet heads 2a and 3a, and each composition is cured using the exposure light source 5 so as to form a white layer 2 and a color layer 3. In FIG. 1, the formation of the white layer 2 and the color layer 3 is repeated for 3 times. After repeating 3 times of the formation, only the color layer 3 is formed in FIG. 1. After the completion of the printing, the support layer 4 in contact with the base 1 is taken off from the base 1, and the support layer 4 is removed by the above-described removing step, and therefore a three-dimensional modeled object is obtained.

In FIG. 1, the white layer 2 and the color layer 3 were formed for 3 times, but practically, it is preferable that the formation is performed for 500 times or more, and the formation of only the color layer 3 is performed 1 time, but practically, it is preferable that the formation is performed for 2 times or more. Regarding the color layer 3 in FIG. 1, practically, the layer is preferably a layer formed from a plurality of color ink compositions C. For example, it is possible to use four color ink compositions C of cyan, magenta, yellow, and black. In addition, a plurality of the inkjet heads 3a from which the color ink composition C is jetted out may be used, and the same number of the inkjet heads as the number (single color) of color ink compositions C used is preferably used. The same explanation on a difference between a practical embodiment and the drawing thereof also applies to the explanation of FIG. 2 to be described later.

Figure 2:
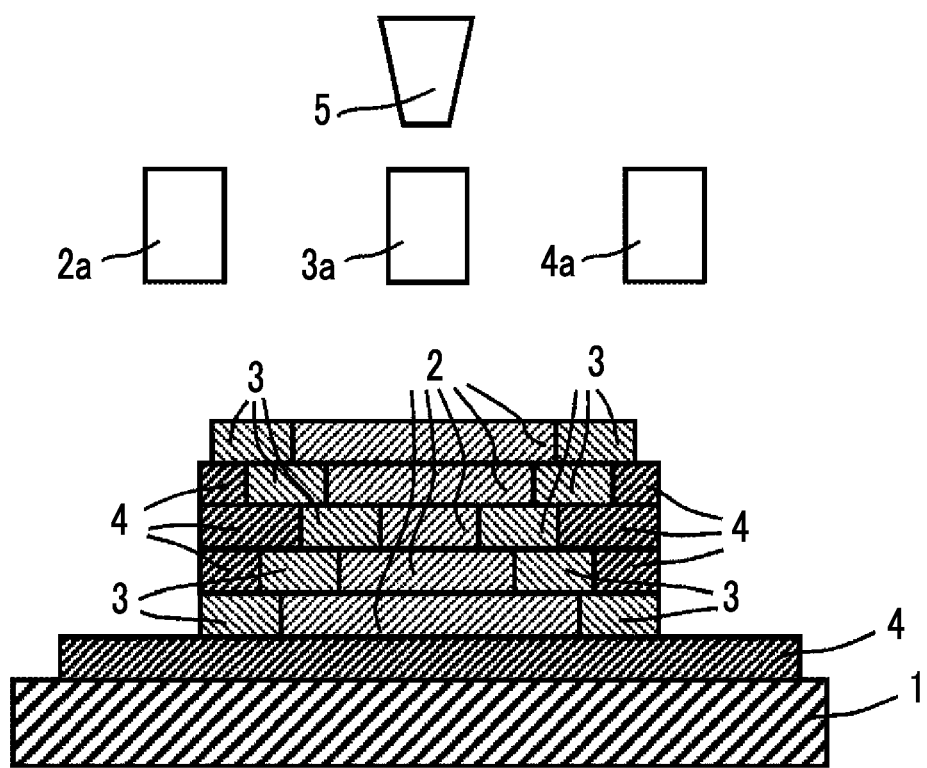
FIG. 2 is a schematic diagram showing another example of three-dimensional printing using a three-dimensional printing method of the present invention.

FIG. 2 is a schematic diagram showing another example of three-dimensional printing using the three-dimensional printing method of the present invention. Until firstly forming the support layer 4 and subsequently forming the first white layer 2 and the color layer 3, the step is the same as that of the three-dimensional printing described in the explanation of FIG. 1, but in a case of the second, third, and fourth formation of the white layer 2 and the color layer 3, the ink composition for a support material is jetted out, and then the support layer 4 is formed. After the completion of the printing, the support layer 4 in contact with the base 1 is taken off from the base 1, the support layer 4 is removed, and therefore a three-dimensional modeled object can be obtained. By forming the support layer as described above, it is possible to obtain a three-dimensional modeled object in which a central portion in a height direction is recessed as exemplified in FIG. 2, for example.

(Three-Dimensional Printing System)

A three-dimensional printing system of the present invention (hereinafter, will also be referred to as "3D printer") includes printing means for jetting out, a plurality of times, each of the white ink composition W and the color ink composition C using an inkjet head so as to form a color layer on a white modeled object, based on cross-sectional information of a three-dimensional modeled object.

The inkjet head used in jetting the white ink composition W is characterized to be capable of being filled with the white ink composition W1 and/or the white ink composition W2 as a white ink composition W.

In addition, the three-dimensional printing system of the present invention includes printing means for jetting out, a plurality of times, each of the white ink composition W and the color ink composition C using an inkjet head so as to form a color layer on a white modeled object, based on cross-sectional information of a three-dimensional modeled object, and it is preferable that the inkjet head used in jetting the white ink composition W is capable of being filled with any one of the white ink composition W1 and the white ink composition W2 as a white ink composition W.

It is preferable that the printing means includes jetting means for jetting the white ink composition W and/or the color ink composition C contained in the inkjet ink set for three-dimensional printing of the present invention from an inkjet head based on cross-sectional information of a three-dimensional modeled object so as to form an ink layer; curing means for curing the ink layer with actinic rays; and repeating means capable of repeating the jetting and the curing.

In addition, it is preferable that the three-dimensional printing method of the present invention includes heating means for heating the ink composition contained in the inkjet ink set for three-dimensional printing of the present invention at a temperature within a range of 40° C. to 80° C., before jetting.

The curing means and the heating means are the same as the curing means and the heating means described in the explanation of the three-dimensional printing method of the present invention, and therefore, a preferred embodiment thereof is also the same.

As the jetting means, an inkjet head is used, and a known inkjet head can be used.

It is preferable that the inkjet head is capable of being filled with any one of the white ink composition W1 and the white ink composition W2.

As described above, by using the inkjet head capable of being filled with any one of the white ink composition W1 and the white ink composition W2, it is possible to change the white ink composition W used in printing. Therefore, it is possible to individually produce a so-called hard three-dimensional modeled object which is excellent in impact resistance and a so-called soft three-dimensional modeled object which is excellent in film softness and film strength, in one apparatus. As a result, operability of a worker is improved.

In addition, it is preferable that the three-dimensional printing system of the present invention includes mounting means for mounting the white ink composition W1 and the white ink composition W2 at the same time, and switching means for switching the white ink composition W used.

The three-dimensional printing system of the present invention may include smoothing means for smoothing a surface of an ink layer with a roller and the like.

Furthermore, it is preferable that the three-dimensional printing system of the present invention include jetting means for jetting the ink composition for a support material having the above composition. The jetting means is not particularly limited, and known jetting means can be used.

It is preferable that the three-dimensional printing system of the present invention can use the ink set of the present invention. It is preferable that the system uses the ink set of the present invention which contains the white ink composition W1 and the white ink composition W2, from the viewpoint of improving the operability.

EXAMPLES

Hereinafter, the present invention will be described in detail by way of Examples; however, the present invention is not intended to be limited to these Examples.

Unless particularly stated otherwise in the following description, the unit "parts" represents "parts by mass", and the unit "percent (%)" represents "percent (%) by mass".

The Tg of a monomer in the following description refers to the glass transition temperature of a homopolymer of the monomer.

<3D Printer for Test>

The inkjet printer KEGON (manufactured by AFIT Corporation) in which transfer stages were modified was used as a 3D printer. A mechanism capable of raising and lowering the height automatically (Horizontal plane Z axis motorized stage KS332-8N manufactured by SURUGA SEIKI CO., LTD.) was provided for the transfer stage. In addition, a metal halide lamp (Vzero II-85, manufactured by Neopt Corporation) was equipped as a curing light source.

<Production of Pigment Dispersion>

The compositions described in Table 1, except for the pigment, were mixed and stirred (10 to 15 minutes, and 2,000 to 3,000 rotations/min) with a mixer manufactured by Silverson Machines, Ltd., and thus a uniform transparent liquid (dilution of dispersant) was obtained. The pigment was added to this transparent liquid (dilution of dispersant), and the mixture was further stirred with a mixer (10 to 20 minutes, and 2,000 to 3,000 rotations/min). Thus, 500 parts of a uniform preliminary dispersion liquid was obtained. Subsequently, the preliminary dispersion liquid was subjected to a dispersion treatment using a circulation type beads mill apparatus manufactured by VMA-Getzmann GmbH (DISPERMAT SL-012C1). Regarding the dispersing conditions, the apparatus was filled with 200 parts of zirconia beads having a diameter of 0.65 mm, and the circumferential speed was set to 15 m/s. The dispersing time was set to 1 to 6 hours.

In this manner, pigment dispersions White 1, Cyan 1, Magenta 1, Yellow 1, Black were prepared.

The numerical value in % by mass described in Table 1 represents the content (% by mass) of an active ingredient with respect to the total mass of the pigment dispersion.

TABLE 1

|  | White 1 | Cyan 1 | Magenta 1 | Yellow 1 | Black |
| --- | --- | --- | --- | --- | --- |
| Pigment | $TiO_2$ | PB 15:4 | Mixed quinacridone | PY155 | Carbon black |
|  | 50% by mass | 30% by mass | 30% by mass | 30% by mass | 30% by mass |
| Dispersant | Sol41000 | Sol32000 | Sol32000 | Sol32000 | Sol32000 |
|  | 10% by mass | 10% by mass | 15% by mass | 10% by mass | 10% by mass |
| UV12 | 0.1% by mass | 0.1% by mass | 0.1% by mass | 0.1% by mass | 0.1% by mass |
| PEA | 39.9% by mass | 59.9% by mass | 54.9% by mass | 59.9% by mass | 59.9% by mass |

The details of the various compounds and abbreviations described in Table 1 are as follows.

$TiO_2$ (titanium oxide, white pigment, KRONOS 2300, manufactured by Kronos, Inc.)

PB15:4 (C.I. Pigment Blue 15:4, cyan pigment, HELIOGEN BLUE D 7110 F, manufactured by BASF SE)

Mixed crystal quinacridone (quinacridone-based mixed crystal pigment, magenta pigment, CINQUASIA MAGENTA L 4540, manufactured by BASF SE)

PY155 (C.I. Pigment Yellow 155, yellow pigment, INK JET YELLOW 4GC, manufactured by Clariant International AG)

Carbon black (black pigment, SPECIAL BLACK 250, manufactured by Degussa)

Sol41000 (dispersant, SOLSPERSE 41000, manufactured by Lubrizol Corporation)

Sol32000 (dispersant, SOLSPERSE 32000, manufactured by Lubrizol Corporation) UV12 (polymerization inhibitor, FLORSTAB UV-12, manufactured by Kromachem GmbH)

PEA (2-phenoxyethyl acrylate, Tg: 5° C., molecular weight: 192, SR339C, manufactured by Sartomer USA, LLC)

<Production of Color Ink Composition C>

The compositions described in the following table were mixed and stirred (10 to 15 minutes, 2,000 to 3,000 rotations/min) with a mixer manufactured by Silverson Machines, Ltd., and thus a uniform liquid composition was obtained. In the following examples and the comparative examples, color ink compositions C1-1, M1-1, Y1-1, and K1-1 of the compositions described in Table 2 were used as a color ink composition C.

The numerical values in Table 2 represent parts by mass of an active ingredient, and sections in which "-" is described indicate that the corresponding compound was not contained.

In addition, each value of the content of the acrylate monomer AC (%), the content of the acrylate monomer BC (%), and the content of the acrylate oligomer CC (%) in Table 2 indicates the total content (% by mass) of each compound corresponding thereto with respect to the total mass of the color ink composition C, and the same applies to the following tables.

TABLE 2

|  |  | C1-1 | M1-1 | Y1-1 | K1-1 |
| --- | --- | --- | --- | --- | --- |
| Acrylate monomer AC | IBOA | 25 | 25 | 25 | 25 |
| Acrylate monomer BC | PEA | 57 | 57 | 57 | 57 |
| Acrylate oligomer CC | UV3000B | 10 | 10 | 10 | 10 |
| Polymerization initiator | TPO | 2 | 2 | 2 | 2 |
|  | Irg2959 | 1.8 | 1.8 | 1.8 | 1.8 |
|  | Irg184 | 2 | 2 | 2 | 2 |
| Pigment dispersion | Cyan 1 | 2 | — | — | — |
|  | Magenta 1 | — | 2 | — | — |
|  | Yellow 1 | — | — | 2 | — |
|  | Black | — | — | — | 2 |

TABLE 2-continued

|  |  | C1-1 | M1-1 | Y1-1 | K1-1 |
| --- | --- | --- | --- | --- | --- |
| Polymerization inhibitor | MEHQ | 0.1 | 0.1 | 0.1 | 0.1 |
| Surfactant | BYK307 | 0.1 | 0.1 | 0.1 | 0.1 |
| Content (%) of acrylate monomer AC |  | 25 | 25 | 25 | 25 |
| Content (%) of acrylate monomer BC |  | 58 | 58 | 58 | 58 |
| Content (%) of acrylate oligomer CC |  | 10 | 10 | 10 | 10 |

IBOA (isobornyl acrylate, Tg: 94° C., molecular weight: 208, SR506D, manufactured by Sartomer USA, LLC)
PEA (2-phenoxyethyl acrylate, Tg: 5° C., molecular weight: 192, SR339C, manufactured by Sartomer USA, LLC)
UV3000B (bifunctional urethane acrylate oligomer, Mw: 18,000, Young's modulus: 4 MPa, SHIKOH UV-3000B, manufactured by Nippon Synthetic Chemical Industry Co., Ltd.)
TPO (2,4,6-trimethylbenzoyldiphenylphosphine oxide, photopolymerization initiator, LUCIRIN TPO, manufactured by BASF SE)
Irgacure2959 (1-[4-(2-hydroxyethoxy)phenyl]-2-hydroxy-2-methyl-1-propan-1-one, photopolymerization initiator, manufactured by BASF SE)
Irgacure184 (1-hydroxycyclohexyl phenyl ketone, photopolymerization initiator, manufactured by BASF SE)
Cyan 1, Magenta 1, Yellow 1, and Black (the above pigment dispersions)
MEHQ (4-methoxyphenol, manufactured by Tokyo Chemical Industry Co., Ltd.)
BYK307 (polydimethylsiloxane-based surfactant, BYK-307, manufactured by BYK Chemie GmbH)

Example 1: Test Using White Ink Composition W1 and Color Ink Compositions C (C1-1, M1-1, Y1-1, and K1-1)

Each compound was mixed according to the compositions described in Table 3 and Table 4 and stirred (10 to 15 minutes, 2,000 to 3,000 rotations/min) with a mixer manufactured by Silverson Machines, Ltd., and thus uniform liquid compositions W1-1 to W1-12 were obtained.

The numerical values in Table 3 and Table 4 represent parts by mass of an active ingredient, and "-" indicates that the corresponding compound was not used.

In addition, each value of the content of the acrylate monomer AW (%), the content of the acrylate monomer BW (%), and the content of the acrylate oligomer CW (%) in Table 3 and Table 4 indicates the content (% by mass) of each compound with respect to the total mass of the white ink composition W, and the same applies to the following tables.

The 3D printer was filled with a support material (manufactured by Stratasys, Ltd.), the color ink compositions C (C1-1, M1-1, Y1-1, and K1-1), and the white ink compositions W (W1-1 to W1-12), and impact test, load test, covering ability, and moldability were evaluated using a method described below.

<Impact Test>

A parallelepiped having a side length of 100 mm×20 mm×5 mm was prepared using the white ink compositions W1-1 to 12 described in Table 3 or Table 4, and with respect to one surface thereof (100 mm×20 mm), check patterns of squares with a side of 5 mm of four colors of cyan, magenta, yellow, and black were printed on the whole surface using the color ink compositions C (C1-1, M1-1, Y1-1, and K1-1). The color ink compositions C were printed such that a thickness of a layer before curing became about 50 μm. Spherical weights each having a weight of 10 g, 5 g, 2 g, and 1 g were dropped from a height of 15 cm to the obtained parallelepiped, and it was visually checked whether cracks were formed or not.

It is possible to say that as the results of the impact test become excellent, the impact resistance of the three-dimensional modeled object obtained becomes excellent.

Excellent 5: No cracks in any weight.
Good 4: Cracks occurred in 10 g.
Acceptable 3: Cracks occurred in 5 g.
Poor 2: Cracks occurred in 2 g.
Very poor 1: Cracks occurred in 1 g.

<Load Test>

A parallelepiped having a side length of 100 mm×20 mm×2 mm was prepared using the white ink compositions W1-1 to 12, and with respect to one surface thereof (100 mm×20 mm), check patterns of squares with a side of 5 mm of four colors of cyan, magenta, yellow, and black were printed on the whole surface using the color ink compositions C (C1-1, M1-1, Y1-1, and K1-1). The color ink compositions C were printed such that a thickness of a layer before curing became about 50 μm. Both ends of the obtained parallelepiped were fixed, and flexures were measured by hanging weights of 50 g, 30 g, 20 g, and 10 g at the center thereof.

It is possible to say that as the results of the load test become excellent, the load-bearing capacity of the three-dimensional modeled object obtained become excellent.

Excellent 5: A flexure on 50 g is less than 1 cm.
Good 4: A flexure on 30 g is less than 1 cm.
Acceptable 3: A flexure on 20 g is less than 1 cm.
Poor 2: A flexure on 10 g is less than 1 cm.
Very poor 1: A flexure on 10 g is 1 cm or more.

<Evaluation of Moldability>

A parallelepiped having a side length of 10 mm×10 mm×5 mm was prepared using the white ink compositions W1-1 to 12, and with respect to one surface thereof (10 mm×10 mm), check patterns of squares with a side of 5 mm of four colors of cyan, magenta, yellow, and black were printed on the whole surface using the color ink compositions C (C1-1, M1-1, Y1-1, and K1-1). The color ink compositions C were printed such that a thickness of a layer before curing became about 50 μm. The angle of vertex of the side of the obtained parallelepiped on which the check patterns were printed was measured, and was evaluated according to the following evaluation standard.

Excellent 5: All the angles of vertex are less than 90±0.5 degrees.
Good 4: The largest error from 90 degrees is 0.5 degree or more and less than 1 degree.
Acceptable 3: The largest error from 90 degrees is 1 degree or more and less than 1.5 degrees.
Poor 2: The largest error from 90 degrees is 1.5 degrees or more and less than 2.0 degrees.
Very poor 1: The largest error from 90 degrees is 2.0 degrees or more.

<Covering Ability (White Only)>

A plate sample having a thickness of 1 mm was prepared using the white ink compositions W1-1 to 12. The brightness (L1) of the sample measured using the inkjet photo paper (KATSAI) manufactured by Fujifilm Corporation as a background, and the brightness (L2) of the sample measured using a blackboard as a background were measured using SPM100-II manufactured by Gretag Company. A covering rate=100×(L2/L1) was calculated and was evaluated according to the following evaluation standard.

Excellent 5: The covering rate is 98 or more.
Good 4: The covering rate is 96 or more and less than 98.
Acceptable 3: The covering rate is 94 or more and less than 96.
Poor 2: The covering rate is 92 or more and less than 94.
Very poor 1: The covering rate is less than 92.

TABLE 3

|  |  | W1-1 | W1-2 | W1-3 | W1-4 | W1-5 | W1-6 | W1-7 | W1-8 |
|---|---|---|---|---|---|---|---|---|---|
| Acrylate monomer AW | IBOA | 34 | — | — | — | 15 | 10 | 35 | 42 |
|  | TMCHA | 25 | 59 | — | — | 15 | 10 | 35 | 42 |
|  | DCPA | — | — | — | 59 | — | — | — | — |
| Other polymerizable compound | TCDDMDA | 10 | 10 | 10 | 10 | 10 | 10 | 10 | — |
| Acrylate monomer BW | PEA | 10 | 10 | 69 | 10 | 39 | 49 | 4 | — |
| Acrylate oligomer CW | CN996 | 10 | 10 | 10 | 10 | 10 | 10 | 5 | 5 |
| Polymerization initiator | TPO | 2 | 2 | 2 | 2 | 2 | 2 | 2 | 2 |
|  | Irg2959 | 1.8 | 1.8 | 1.8 | 1.8 | 1.8 | 1.8 | 1.8 | 1.8 |
|  | Irg184 | 2 | 2 | 2 | 2 | 2 | 2 | 2 | 2 |
| Pigment dispersion | White 1 | 5 | 5 | 5 | 5 | 5 | 5 | 5 | 5 |
| Polymerization inhibitor | MEHQ | 0.1 | 0.1 | 0.1 | 0.1 | 0.1 | 0.1 | 0.1 | 0.1 |
| Surfactant | BYK307 | 0.1 | 0.1 | 0.1 | 0.1 | 0.1 | 0.1 | 0.1 | 0.1 |
| Content (%) of acrylate monomer AW |  | 59 | 59 | 0 | 59 | 30 | 20 | 70 | 84 |
| Content (%) of acrylate monomer BW |  | 12 | 12 | 71 | 12 | 41 | 51 | 6 | 2 |
| Content (%) of acrylate oligomer CW |  | 10 | 10 | 10 | 10 | 10 | 10 | 5 | 5 |
| Impact test |  | 5 | 5 | 5 | 4 | 5 | 5 | 3 | 3 |
| Load test |  | 5 | 5 | 3 | 5 | 3 | 3 | 5 | 5 |
| Covering ability |  | 5 | 5 | 5 | 5 | 5 | 5 | 5 | 5 |
| Moldability |  | 5 | 5 | 5 | 5 | 5 | 5 | 5 | 5 |

TABLE 4

|  |  | W1-9 | W1-10 | W1-11 | W1-12 |
|---|---|---|---|---|---|
| Acrylate monomer AW | IBOA | 30 | 30 | 30 | 34 |
|  | TMCHA | 20 | 20 | 20 | 25 |
| Other polymerizable compound | TCDDMDA | 10 | 10 | 10 | 10 |
| Acrylate monomer BW | PEA | 9 | 2 | 21 | 14 |
| Acrylate oligomer CW | CN996 | 10 | 10 | 10 | 10 |
| Polymerization initiator | TPO | 2 | 2 | 2 | 2 |
|  | Irg2959 | 1.8 | 1.8 | 1.8 | 1.8 |
|  | Irg184 | 2 | 2 | 2 | 2 |
| Pigment dispersion | White 1 | 15 | 22 | 3 | 1 |
| Polymerization inhibitor | MEHQ | 0.1 | 0.1 | 0.1 | 0.1 |
| Surfactant | BYK307 | 0.1 | 0.1 | 0.1 | 0.1 |
| Content (%) of acrylate monomer AW |  | 50 | 50 | 50 | 59 |
| Content (%) of acrylate monomer BW |  | 15 | 11 | 22 | 14 |
| Content (%) of acrylate oligomer CW |  | 10 | 10 | 10 | 10 |
| Impact test |  | 5 | 5 | 5 | 5 |
| Load test |  | 5 | 4 | 5 | 5 |

TABLE 4-continued

|  | W1-9 | W1-10 | W1-11 | W1-12 |
|---|---|---|---|---|
| Covering ability | 5 | 5 | 3 | 1 |
| Moldability | 4 | 2 | 4 | 4 |

The details of the various compounds and abbreviations described in Table 3 and Table 4 in addition to those described above are as follows.

TMCHA (3,3,5-trimethylcyclohexyl acrylate, Tg: 27° C., molecular weight: 195, SR420, manufactured by Sartomer USA, LLC)

DCPA (dicyclopentanyl acrylate, Tg: 120° C., molecular weight: 204.3, FA513AS, manufactured by Hitachi Chemical Co., Ltd.)

TCDDMDA (tricyclodecanedimethanol diacrylate, Tg: 187° C., molecular weight: 304, SR833S, manufactured by Sartomer USA, LLC)

CN996 (bifunctional urethane acrylate oligomer, Mw: 2,850, Young's modulus: 21 MPa, manufactured by Sartomer USA, LLC)

White 1 (the pigment dispersion described above)

Example 2: Test Using White Ink Composition W2 and Color Ink Compositions C (C1-1, M1-1, Y1-1, and K1-1)

Each compound was mixed according to the compositions described in Table 3 and Table 4 and stirred (10 to 15 minutes, 2,000 to 3,000 rotations/min) with a mixer manufactured by Silverson Machines, Ltd., and thus uniform liquid compositions W2-1 to 22 were obtained.

The numerical values in Table 5 to Table 7 represent parts by mass of an active ingredient, and "-" indicates that the corresponding compound was not used.

The 3D printer was filled with an ink composition for a support material (manufactured by Stratasys, Ltd.), the color ink compositions C (C1-1, M1-1, Y1-1, and K1-1), and the white ink compositions W2 (W2-1 to 22), and film softness, film strength, covering ability, moldability, and the failure due to the removal of the support material were evaluated using a method described below.

<Evaluation of Moldability>

A parallelepiped having a side length of 10 mm×10 mm×5 mm was prepared using the white ink compositions W2-1 to 22, and with respect to one surface thereof (10 mm×10 mm), check patterns of squares with a side of 5 mm of four colors of cyan, magenta, yellow, and black were printed on the whole surface using the color ink compositions C (C1-1, M1-1, Y1-1, and K1-1). The color ink compositions C were printed such that a thickness of a layer before curing became about 50 μm. The angle of vertex of the side of the obtained parallelepiped on which the check patterns were printed was measured, and was evaluated according to the following evaluation standard.

Excellent 5: All the angles of vertex are less than 90±0.5 degrees.

Good 4: The largest error from 90 degrees is 0.5 degree or more and less than 1 degree.

Acceptable 3: The largest error from 90 degrees is 1 degree or more and less than 1.5 degrees.

Poor 2: The largest error from 90 degrees is 1.5 degrees or more and less than 2.0 degrees.

Very poor 1: The largest error from 90 degrees is 2.0 degrees or more.

<Covering Ability (White Only)>

A plate sample having a thickness of 1 mm was prepared using the white ink compositions W2-1 to 22. The brightness (L1) of the sample measured using the inkjet photo paper (KATSAI) manufactured by Fujifilm Corporation as a background, and the brightness (L2) of the sample measured using a blackboard as a background were measured using SPM100-II manufactured by Gretag Company. A covering rate=100×(L2/L1) was calculated and was evaluated according to the following evaluation standard.

Excellent 5: The covering rate is 98 or more.

Good 4: The covering rate is 96 or more and less than 98.

Acceptable 3: The covering rate is 94 or more and less than 96.

Poor 2: The covering rate is 92 or more and less than 94.

Very poor 1: The covering rate is less than 92.

<Film Softness>

A parallelepiped having a side length of 30 mm×30 mm×10 mm was prepared using the white ink compositions W2-1 to 22, and with respect to one surface thereof (30 mm×30 mm), check patterns of squares with a side of 5 mm of four colors of cyan, magenta, yellow, and black were printed on the whole surface using the color ink compositions C (C1-1, M1-1, Y1-1, and K1-1). The color ink compositions C were printed such that a thickness of a layer before curing became about 50 μm. The softness of the color-printed side of the obtained parallelepiped was measured using a durometer (GS-779G Teclock Corporation).

Excellent 5: 0 or more and less than 30

Good 4: 30 or more and less than 60

Acceptable 3: 60 or more and less than 95

Poor 2: 95 or more and less than 100

Very poor 1: 100 or more

<Film Strength>

A plate-shaped sample having a side length of 80 mm×10 mm×2 mm was prepared using the white ink compositions W2-1 to 22, and with respect to one surface thereof (80 mm×10 mm), check patterns of squares with a side of 5 mm of four colors of cyan, magenta, yellow, and black were printed on the whole surface using the color ink compositions C (C1-1, M1-1, Y1-1, and K1-1). The color ink compositions C were printed such that a thickness of a layer before curing became about 50 μm. A tensile test (AUTOGRAPH AGS-X 5KN, manufactured by Shimadzu Corporation) was performed using the plate-shaped sample thus obtained. Thus, tensile strength was measured and was evaluated according to the following standard. The plate-shaped sample was molded such that the direction of longer length would be horizontal to the stand. Furthermore, during the test, a short strip having a size of 80 mm×10 mm×2 mm was pulled in the longitudinal direction, and the parts extending for about 10 mm respectively from the top and the bottom were clamped.

Excellent 5: Tensile strength is 30 N or more.

Good 4: Tensile strength is 20 N or more and less than 30 N.

Acceptable 3: Tensile strength is 10 N or more and less than 20 N.

Poor 2: Tensile strength is 5 N or more and less than 10 N.

Very poor 1: Tensile strength is less than 5 N.

<Evaluation of Failure Occurrence Ratio Caused by Removal of Support Material>

A round-shaped support layer was formed in a central portion of the white layer formed by using the white ink compositions W2-1 to 22, and therefore a tube-shaped sample having an inner diameter of 10 mm, an outer diameter of 11 mm, a thickness of 1 mm, and a length of 5 cm was modeled. The support material was removed using a water spray system for support material removal installed on OBJET260 CONNEX. For the tube thus obtained, the failure occurrence ratio such as tear-off was investigated.

Meanwhile, the tube-shaped sample was modeled such that the direction of longer length would be horizontal to the stand. The removal of the support material was achieved by spraying water from all directions, and this was continued until the support material was removed. A time period of about 10 minutes on the average was required.

Excellent 5: Failure occurred less than 1 time in ten times of modeling.

Good 4: Failure occurred less than 3 times in ten times of modeling.

Acceptable 3: Failure occurred less than 5 times in ten times of modeling.

Poor 2: Failure occurred less than 6 times in ten times of modeling.

Very poor 1: Failure occurred 6 times or more in ten times of modeling.

TABLE 5

|  |  | W2-1 | W2-2 | W2-3 | W2-4 | W2-5 | W2-6 | W2-7 | W2-8 |
|---|---|---|---|---|---|---|---|---|---|
| Acrylate monomer AW | IBOA | 25 | — | — | — | 5 | 3 | 35 | 45 |
|  | TMCHA | — | 25 | — | — | — | — | — | — |
|  | DCPA | — | — | — | 25 | — | — | — | — |
| Acrylate monomer BW | PEA | 54 | 54 | 79 | 54 | 74 | 76 | 44 | 34 |
| Acrylate oligomer CW | UV3000B | 10 | 10 | 10 | 10 | 10 | 10 | 10 | 10 |
| Polymerization initiator | TPO | 2 | 2 | 2 | 2 | 2 | 2 | 2 | 2 |
|  | Irg2959 | 1.8 | 1.8 | 1.8 | 1.8 | 1.8 | 1.8 | 1.8 | 1.8 |
|  | Irg184 | 2 | 2 | 2 | 2 | 2 | 2 | 2 | 2 |
| Pigment dispersion | White 1 | 5 | 5 | 5 | 5 | 5 | 5 | 5 | 5 |
| Polymerization inhibitor | MEHQ | 0.1 | 0.1 | 0.1 | 0.1 | 0.1 | 0.1 | 0.1 | 0.1 |
| Surfactant | BYK307 | 0.1 | 0.1 | 0.1 | 0.1 | 0.1 | 0.1 | 0.1 | 0.1 |
| Content (%) of acrylate monomer AW |  | 25 | 25 | 0 | 25 | 5 | 3 | 35 | 45 |
| Content (%) of acrylate monomer BW |  | 56 | 56 | 81 | 56 | 76 | 78 | 46 | 36 |
| Content (%) of acrylate oligomer CW |  | 10 | 10 | 10 | 10 | 10 | 10 | 10 | 10 |
| Film softness |  | 5 | 5 | 5 | 4 | 5 | 5 | 4 | 3 |
| Film strength |  | 5 | 5 | 3 | 5 | 4 | 3 | 5 | 5 |
| Covering ability |  | 5 | 5 | 5 | 5 | 5 | 5 | 5 | 5 |
| Moldability |  | 5 | 5 | 5 | 5 | 5 | 5 | 5 | 5 |
| Failure due to removal of support material |  | 5 | 5 | 3 | 5 | 4 | 3 | 5 | 5 |

TABLE 6

|  |  | W2-9 | W2-10 | W2-11 | W2-12 | W2-13 | W2-14 | W2-15 |
|---|---|---|---|---|---|---|---|---|
| Acrylate monomer AW | IBOA | 25 | 25 | 25 | 25 | 25 | 10 | — |
|  | TMCHA | — | — | 54 | 14 | 29 | — | — |
| Acrylate monomer BW | PEA | — | — | — | 40 | 25 | 69 | 79 |
|  | IDA | 54 | — | — | — | — | — | — |
| Other polymerizable compound | DEG EA | — | 54 | — | — | — | — | — |
| Acrylate oligomer CW | UV3000B | 10 | 10 | 10 | 10 | 10 | 10 | 10 |
| Polymerization initiator | TPO | 2 | 2 | 2 | 2 | 2 | 2 | 2 |
|  | Irg2959 | 1.8 | 1.8 | 1.8 | 1.8 | 1.8 | 1.8 | 1.8 |
|  | Irg184 | 2 | 2 | 2 | 2 | 2 | 2 | 2 |
| Pigment dispersion | White 1 | 5 | 5 | 5 | 5 | 5 | 5 | 5 |
| Polymerization inhibitor | MEHQ | 0.1 | 0.1 | 0.1 | 0.1 | 0.1 | 0.1 | 0.1 |
| Surfactant | BYK307 | 0.1 | 0.1 | 0.1 | 0.1 | 0.1 | 0.1 | 0.1 |
| Content (%) of acrylate monomer AW |  | 25 | 25 | 79 | 39 | 54 | 10 | 0 |
| Content (%) of acrylate monomer BW |  | 56 | 2 | 2 | 42 | 27 | 71 | 81 |
| Content (%) of acrylate oligomer CW |  | 10 | 10 | 10 | 10 | 10 | 10 | 10 |
| Film softness |  | 5 | 5 | 3 | 5 | 3 | 5 | 5 |
| Film strength |  | 4 | 3 | 5 | 5 | 5 | 5 | 3 |
| Covering ability |  | 5 | 5 | 5 | 5 | 5 | 5 | 5 |
| Moldability |  | 5 | 5 | 5 | 5 | 5 | 5 | 4 |
| Failure due to removal of support material |  | 4 | 3 | 5 | 5 | 5 | 5 | 3 |

TABLE 7

|  |  | W2-16 | W2-17 | W2-18 | W2-19 | W2-20 | W2-21 | W2-22 |
|---|---|---|---|---|---|---|---|---|
| Acrylate monomer AW | IBOA | 25 | 25 | 25 | 25 | 25 | 25 | 25 |
| Acrylate monomer BW | PEA | 54 | 54 | 54 | 54 | 54 | 60 | 39 |
| Acrylate oligomer CW | CN996 | 10 | — | — | — | — | — | — |
|  | UV3000B | — | — | — | — | — | 4 | 25 |
| Other polymerizable compound | CN991 | — | 10 | — | — | — | — | — |
|  | UV3700B | — | — | 10 | — | — | — | — |
|  | CN710 | — | — | — | 10 | — | — | — |
|  | CN989 | — | — | — | — | 10 | — | — |

TABLE 7-continued

|  |  | W2-16 | W2-17 | W2-18 | W2-19 | W2-20 | W2-21 | W2-22 |
|---|---|---|---|---|---|---|---|---|
| Polymerization initiator | TPO | 2 | 2 | 2 | 2 | 2 | 2 | 2 |
|  | Irg2959 | 1.8 | 1.8 | 1.8 | 1.8 | 1.8 | 1.8 | 1.8 |
|  | Irg184 | 2 | 2 | 2 | 2 | 2 | 2 | 2 |
| Pigment dispersion | White 1 | 5 | 5 | 5 | 5 | 5 | 5 | 5 |
| Polymerization inhibitor | MEHQ | 0.1 | 0.1 | 0.1 | 0.1 | 0.1 | 0.1 | 0.1 |
| Surfactant | BYK307 | 0.1 | 0.1 | 0.1 | 0.1 | 0.1 | 0.1 | 0.1 |
| Content (%) of acrylate monomer AW |  | 25 | 25 | 25 | 25 | 25 | 25 | 25 |
| Content (%) of acrylate monomer BW |  | 56 | 56 | 56 | 56 | 56 | 62 | 41 |
| Content (%) of acrylate oligomer CW |  | 10 | 0 | 0 | 0 | 0 | 4 | 25 |
| Film softness |  | 4 | 3 | 5 | 5 | 3 | 5 | 3 |
| Film strength |  | 5 | 4 | 3 | 3 | 5 | 3 | 5 |
| Covering ability |  | 5 | 5 | 5 | 5 | 5 | 5 | 5 |
| Moldability |  | 5 | 5 | 3 | 5 | 5 | 3 | 5 |
| Failure due to removal of support material |  | 5 | 5 | 4 | 3 | 5 | 3 | 5 |

The details of the various compounds and abbreviations described in Table 5 to Table 7 in addition to those described above are as follows.

IDA (isodecyl acrylate, Tg: −60° C., SR395, manufactured by Sartomer USA, LLC)

UV3000B (bifunctional urethane acrylate oligomer, Mw: 18,000, Young's modulus: 4 MPa, SHIKOH UV-3000B, manufactured by Nippon Synthetic Chemical Industry Co., Ltd.)

DEG EA (diethylene glycol monobutyl ether acrylate, Tg: −74° C., molecular weight: 216, CD278, manufactured by Sartomer USA, LLC)

CN991 (bifunctional urethane acrylate oligomer having a polyester structure, Mw: 1,500, Young's modulus: 13 MPa, manufactured by Sartomer USA, LLC)

UV3700B (bifunctional urethane acrylate oligomer, Mw: 38,000, Young's modulus: 0.5 MPa, SHIKOH UV-3700B, manufactured by Nippon Synthetic Chemical Industry Co., Ltd.)

CN710 (monofunctional polyester acrylate oligomer, Mw: 5,000, Young's modulus: 0.2 MPa, manufactured by Sartomer USA, LLC)

CN989 (trifunctional urethane acrylate oligomer, Mw: 4,000, Young's modulus: 1,360 MPa, manufactured by Sartomer USA, LLC)

Example 3: Test Using White Ink Compositions W (W1 and W2) and Color Ink Compositions C (C1-1 to 22)

Each compound was mixed according to the compositions described in Table 8 to Table 10 and stirred (10 to 15 minutes, 2,000 to 3,000 rotations/min) with a mixer manufactured by Silverson Machines, Ltd., and thus uniform liquid compositions C1-1 to 22 were obtained.

The numerical values in Table 5 to Table 7 represent parts by mass of an active ingredient, and "-" indicates that the corresponding compound was not used.

The 3D printer was filled with a support material (manufactured by Stratasys, Ltd.), the white ink compositions W (W1-1 and W2-1), and the color ink compositions C (C1-1 to C1-22, and the cyan ink composition), and impact test, load test, tensile test, bending test, and rubbing test were evaluated using a method described below.

<Impact Test>

A parallelepiped having a side length of 100 mm×20 mm×5 mm was prepared using the white ink composition W1-1, and with respect to one surface thereof (100 mm×20 mm), monochromatic images of homogeneous cyan were printed on the whole surface using the color ink compositions C (C1-1 to C1-22). The color ink compositions C were printed such that a thickness of a layer before curing became about 50 μm. Spherical weights each having a weight of 10 g, 5 g, 2 g, and 1 g were dropped from a height of 15 cm to the obtained parallelepiped, and it was visually checked whether cracks were formed or not.

It is possible to say that as the results of the impact test become excellent, the impact resistance of the three-dimensional modeled object obtained becomes excellent. The descriptions of W1-1 or W2-1 described in the sections of impact test, load test, tensile test, bending test, and rubbing test of the table indicate the white ink composition W used.

Excellent 5: No cracks in any weight.
Good 4: Cracks occurred in 10 g.
Acceptable 3: Cracks occurred in 5 g.
Poor 2: Cracks occurred in 2 g.
Very poor 1: Cracks occurred in 1 g.

<Load Test>

A parallelepiped having a side length of 100 mm×20 mm×2 mm was prepared using the white ink composition W1-1, and with respect to one surface thereof (100 mm×20 mm), monochromatic images of homogeneous cyan were printed on the whole surface using the color ink compositions C (C1-1 to C1-22). The color ink compositions C were printed such that a thickness of a layer before curing became about 50 μm. Both ends of the obtained parallelepiped were fixed, and flexures were measured by hanging weights of 50 g, 30 g, 20 g, and 10 g at the center thereof.

It is possible to say that as the results of the load test become excellent, the load-bearing capacity of the three-dimensional modeled object obtained becomes excellent.

Excellent 5: A flexure on 50 g is less than 1 cm.
Good 4: A flexure on 30 g is less than 1 cm.
Acceptable 3: A flexure on 20 g is less than 1 cm.
Poor 2: A flexure on 10 g is less than 1 cm.
Very poor 1: A flexure on 10 g is 1 cm or more.

<Tensile Test>

After the load test, the white ink composition W1-1 with which the inkjet head was filled was changed to the white ink composition W2-1. A plate-shaped sample of 80 mm×10 mm×2 mm was prepared using the white ink composition W2-1, and with respect to one surface thereof (80 mm×10 mm), monochromatic images of homogeneous color were printed on the whole surface using the color ink compositions C (C1-1 to C1-22). The color ink compositions C were printed such that a thickness of a layer before curing became about 50 μm. A tensile test (AUTOGRAPH AGS-X 5KN, manufactured by Shimadzu Corporation) was performed using the plate-shaped sample thus obtained, and the evaluation thereof was performed according to the following standard. The plate-shaped sample was molded such that the direction of longer length would be horizontal to the stand. Furthermore, during the test, a short strip having a size of 80 mm×10 mm×2 mm was pulled in the longitudinal direction, and the parts extending for about 10 mm respectively from the top and the bottom were clamped.

Excellent 5: No cracks occurred in a part of the monochromatic image of homogeneous color even at stretch ratio of 300% or more Good 4: No cracks occurred in a part of the monochromatic image of homogeneous color at stretch ratio of 200% or more and less than 300%

Acceptable 3: No cracks occurred in a part of the monochromatic image of homogeneous color at stretch ratio of 100% or more and less than 200%

Poor 2: No cracks occurred in a part of the monochromatic image of homogeneous color at stretch ratio of 50% or more and less than 100%

Very poor 1: Cracks occurred in a part of the monochromatic image of homogeneous color at stretch ratio of 50% or more and less than 100%

<Bending Test>

A plate-shaped sample of 80 mm×10 mm×1 mm was prepared using the white ink composition W2-1, and with respect to one surface thereof (80 mm×10 mm), monochromatic images of homogeneous cyan were printed on the whole surface using the color ink compositions C (C1-1 to C1-22). The color ink compositions C were printed such that a thickness of a layer before curing became about 50 µm. The obtained plate-shaped sample was bent a plurality of times at 180 degrees, and evaluated according to the following standard.

Excellent 5: No cracks occurred in a part of the monochromatic image of homogeneous color even in a case of bending 50 times or more Good 4: No cracks occurred in a part of the monochromatic image of homogeneous color in a case of bending 30 times or more and less than 50 times Acceptable 3: No cracks occurred in a part of the monochromatic image of homogeneous color in a case of bending 20 times or more and less than 30 times Poor 2: No cracks occurred in a part of the monochromatic image of homogeneous color in a case of bending 10 times or more and less than 20 times Very poor 1: No cracks occurred in a part of the monochromatic image of homogeneous color in a case of bending less than 20 times <Rubbing Test>

A plate-shaped sample of 100 mm×100 mm×10 mm was prepared using the white ink composition W2-1, and with respect to one surface thereof (100 mm×100 mm), monochromatic images of homogeneous cyan were printed on the whole surface using the color ink compositions C (C1-1 to C1-22). A part of the monochromatic image of homogeneous color of the obtained sample was rubbed a plurality of times using a cloth, and evaluated according to the following standard.

Excellent 5: No irregularities occurred in a part of the monochromatic image of homogeneous color even in a case of rubbing 100 times or more Good 4: No irregularities occurred in a part of the monochromatic image of homogeneous color in a case of rubbing 50 times or more and less than 100 times Acceptable 3: No irregularities occurred in a part of the monochromatic image of homogeneous color in a case of rubbing 30 times or more and less than 50 times Poor 2: No irregularities occurred in a part of the monochromatic image of homogeneous color in a case of rubbing 10 times or more and less than 30 times Very poor 1: No irregularities occurred in a part of the monochromatic image of homogeneous color in a case of rubbing 50 times or more and less than 10 times

TABLE 8

|  |  | C1-1 | C1-2 | C1-3 | C1-4 | C1-5 | C1-6 | C1-7 | C1-8 |
|---|---|---|---|---|---|---|---|---|---|
| Acrylate monomer AC | IBOA | 25 | — | — | — | 10 | 3 | 40 | 55 |
|  | TMCHA | — | 25 | — | — | — | — | — | — |
|  | DCPA | — | — | — | 25 | — | — | — | — |
| Acrylate monomer BC | PEA | 57 | 57 | 82 | 57 | 72 | 79 | 42 | 27 |
| Acrylate oligomer CC | UV3000B | 10 | 10 | 10 | 10 | 10 | 10 | 10 | 10 |
| Polymerization initiator | TPO | 2 | 2 | 2 | 2 | 2 | 2 | 2 | 2 |
|  | Irg2959 | 1.8 | 1.8 | 1.8 | 1.8 | 1.8 | 1.8 | 1.8 | 1.8 |
|  | Irg184 | 2 | 2 | 2 | 2 | 2 | 2 | 2 | 2 |
| Pigment dispersion | Cyan 1 | 2 | 2 | 2 | 2 | 2 | 2 | 2 | 2 |
| Polymerization inhibitor | MEHQ | 0.1 | 0.1 | 0.1 | 0.1 | 0.1 | 0.1 | 0.1 | 0.1 |
| Surfactant | BYK307 | 0.1 | 0.1 | 0.1 | 0.1 | 0.1 | 0.1 | 0.1 | 0.1 |
| Content (%) of acrylate monomer AC |  | 25 | 25 | 0 | 25 | 10 | 3 | 40 | 55 |
| Content (%) of acrylate monomer BC |  | 58 | 58 | 83 | 58 | 73 | 80 | 43 | 28 |
| Content (%) of acrylate oligomer CC |  | 10 | 10 | 10 | 10 | 10 | 10 | 10 | 10 |
| Impact test W1-1 |  | 5 | 5 | 5 | 5 | 5 | 5 | 5 | 5 |
| Load test W1-1 |  | 5 | 5 | 5 | 5 | 5 | 5 | 5 | 5 |
| Tensile test W2-1 |  | 5 | 5 | 5 | 3 | 5 | 5 | 3 | 1 |
| Bending test W2-1 |  | 5 | 5 | 5 | 4 | 5 | 5 | 4 | 2 |
| Rubbing test W2-1 |  | 5 | 4 | 1 | 5 | 3 | 1 | 5 | 5 |

TABLE 9

|  |  | C1-9 | C1-10 | C1-11 | C1-12 | C1-13 | C1-14 | C1-15 |
|---|---|---|---|---|---|---|---|---|
| Acrylate monomer AC | IBOA | 25 | 25 | 25 | 25 | 38 | 10 | — |
|  | TMCHA | — | — | 57 | 17 | 29 | — | — |
| Acrylate monomer BC | PEA | — | — | — | 40 | 15 | 72 | 82 |
|  | IDA | 57 | — | — | — | — | — | — |
| Other polymerizable compound | DEG EA | — | 57 | — | — | — | — | — |
| Acrylate oligomer CC | UV3000B | 10 | 10 | 10 | 10 | 10 | 10 | 10 |

TABLE 9-continued

|  |  | C1-9 | C1-10 | C1-11 | C1-12 | C1-13 | C1-14 | C1-15 |
|---|---|---|---|---|---|---|---|---|
| Polymerization initiator | TPO | 2 | 2 | 2 | 2 | 2 | 2 | 2 |
|  | Irg2959 | 1.8 | 1.8 | 1.8 | 1.8 | 1.8 | 1.8 | 1.8 |
|  | Irg184 | 2 | 2 | 2 | 2 | 2 | 2 | 2 |
| Pigment dispersion | Cyan 1 | 2 | 2 | 2 | 2 | 2 | 2 | 2 |
| Polymerization inhibitor | MEHQ | 0.1 | 0.1 | 0.1 | 0.1 | 0.1 | 0.1 | 0.1 |
| Surfactant | BYK307 | 0.1 | 0.1 | 0.1 | 0.1 | 0.1 | 0.1 | 0.1 |
| Content (%) of acrylate monomer AC |  | 25 | 25 | 82 | 42 | 67 | 10 | 0 |
| Content (%) of acrylate monomer BC |  | 58 | 1 | 1 | 41 | 16 | 73 | 83 |
| Content (%) of acrylate oligomer CC |  | 10 | 10 | 10 | 10 | 10 | 10 | 10 |
| Impact test W1-1 |  | 5 | 5 | 5 | 5 | 5 | 5 | 5 |
| Load test W1-1 |  | 5 | 5 | 5 | 5 | 5 | 5 | 5 |
| Tensile test W2-1 |  | 5 | 5 | 1 | 5 | 2 | 5 | 5 |
| Bending test W2-1 |  | 5 | 5 | 2 | 5 | 3 | 5 | 5 |
| Rubbing test W2-1 |  | 3 | 1 | 5 | 5 | 5 | 3 | 1 |

TABLE 10

|  |  | C1-16 | C1-17 | C1-18 | C1-19 | C1-20 | C1-21 | C1-22 |
|---|---|---|---|---|---|---|---|---|
| Acrylate monomer AC | IBOA | 25 | 25 | 25 | 25 | 25 | 25 | 25 |
| Acrylate monomer BC | PEA | 54 | 54 | 54 | 54 | 54 | 60 | 39 |
| Acrylate oligomer CC | CN996 | 10 | — | — | — | — | — | — |
|  | UV3000B | — | — | — | — | — | 4 | 25 |
| Other polymerizable compound | CN991 | — | 10 | — | — | — | — | — |
|  | UV3700B | — | — | 10 | — | — | — | — |
|  | CN710 | — | — | — | 10 | — | — | — |
|  | CN989 | — | — | — | — | 10 | — | — |
| Polymerization initiator | TPO | 2 | 2 | 2 | 2 | 2 | 2 | 2 |
|  | Irg2959 | 1.8 | 1.8 | 1.8 | 1.8 | 1.8 | 1.8 | 1.8 |
|  | Irg184 | 2 | 2 | 2 | 2 | 2 | 2 | 2 |
| Pigment dispersion | Cyan 1 | 5 | 5 | 5 | 5 | 5 | 5 | 5 |
| Polymerization inhibitor | MEHQ | 0.1 | 0.1 | 0.1 | 0.1 | 0.1 | 0.1 | 0.1 |
| Surfactant | BYK307 | 0.1 | 0.1 | 0.1 | 0.1 | 0.1 | 0.1 | 0.1 |
| Content (%) of acrylate monomer AC |  | 25 | 25 | 25 | 25 | 25 | 25 | 25 |
| Content (%) of acrylate monomer BC |  | 57 | 57 | 57 | 57 | 57 | 63 | 42 |
| Content (%) of acrylate oligomer CC |  | 10 | 0 | 0 | 0 | 0 | 4 | 25 |
| Impact test W1-1 |  | 5 | 5 | 5 | 5 | 5 | 5 | 5 |
| Load test W1-1 |  | 5 | 5 | 5 | 5 | 5 | 5 | 5 |
| Tensile test W2-1 |  | 4 | 4 | 5 | 5 | 3 | 5 | 4 |
| Bending test W2-1 |  | 5 | 4 | 5 | 5 | 4 | 5 | 5 |
| Rubbing test W2-1 |  | 5 | 5 | 4 | 3 | 5 | 3 | 5 |

Even in a case where tests were performed in the same manner as Example 3 except that the pigment dispersion, cyan 1 in each color ink composition C (C1-1 to C-22) of Example 3 was changed to magenta 1, yellow 1, or black, the same results as in Example 3 were obtained.

EXPLANATION OF REFERENCES

1: base
2: white layer
3: color layer
4: support layer
2a, 3a, 4a: inkjet head
5: exposure light source

What is claimed is:

1. An actinic ray-curable-type inkjet ink set for three-dimensional printing, comprising:
   a white ink composition W having the following composition; and
   a color ink composition C having the following composition,
   wherein the white ink composition W contains a white pigment and a polymerizable compound, in which a content of the white pigment is 0.5% by mass to 10% by mass with respect to a total mass of the white ink composition W, and
   the color ink composition C contains a colorant, an acrylate monomer AC which forms a homopolymer having a glass transition temperature of 25° C. to 120° C., and an acrylate monomer BC which forms a homopolymer having a glass transition temperature of −60° C. or higher and lower than 25° C., in which, with respect to a total mass of the color ink composition C, a content of the acrylate monomer AC is 5% by mass or more and less than 50% by mass and a content of the acrylate monomer BC is 20% by mass or more and less than 80% by mass,
   wherein the actinic ray-curable-type inkjet ink set for three-dimensional printing further comprises an ink composition for a support material, the ink composition comprising a monofunctional acrylate compound, a polymerization initiator, and a water-soluble non-curing component, in which, with respect to a total mass of the ink composition for a support material, a content of a polyfunctional acrylate compound is 5% by mass or less, and a colorant is not substantially contained in the ink composition for a support material.

2. The actinic ray-curable-type inkjet ink set for three-dimensional printing according to claim 1, comprising a white ink composition W1 having the following composition as the white ink composition W,
   wherein the white ink composition W1 contains, as the polymerizable compound, an acrylate monomer AW which forms a homopolymer having a glass transition temperature of 25° C. to 120° C., in which, with respect to a total mass of the white ink composition W1, a content of the acrylate monomer AW in the white ink composition W1 is 40% by mass or more and less than 80% by mass.

3. The actinic ray-curable-type inkjet ink set for three-dimensional printing according to claim 1, comprising a white ink composition W2 having the following composition as the white ink composition W,
wherein the white ink composition W2 contains, as the polymerizable compound, an acrylate monomer AW which forms a homopolymer having a glass transition temperature of 25° C. to 120° C., an acrylate monomer BW which forms a homopolymer having a glass transition temperature of −60° C. or higher and lower than 25° C., and a bifunctional acrylate oligomer CW having a weight-average molecular weight of 2,000 to 20,000, in which, with respect to a total mass of the white ink composition W2, a content of the acrylate monomer AW in the white ink composition W2 is 5% by mass or more and less than 40% by mass, a content of the acrylate monomer BW in the white ink composition W2 is 30% by mass or more and less than 80% by mass, and a content of the acrylate oligomer CW in the white ink composition W2 is 5% by mass or more and less than 20% by mass.

4. The actinic ray-curable-type inkjet ink set for three-dimensional printing according to claim 1, comprising a color ink composition C1 having the following composition as the color ink composition C,
wherein the color ink composition C 1 further contains a bifunctional acrylate oligomer CC having a weight-average molecular weight of 2,000 to 20,000, in which, with respect to a total mass of the color ink composition C1, a content of the acrylate monomer AC in the color ink composition C1 is 5% by mass or more and less than 40% by mass, a content of the acrylate monomer BC in the color ink composition C1 is 30% by mass or more and less than 80% by mass, and a content of the acrylate oligomer CC in the color ink composition C1 is 5% by mass or more and less than 20% by mass.

5. A three-dimensional printing method, comprising:
jetting out, a plurality of times, each of the white ink composition W and the color ink composition C contained in the inkjet ink set for three-dimensional printing according to claim 1 using an inkjet head so as to form a color layer on a white modeled object, based on cross-sectional information of a three-dimensional modeled object.

6. The three-dimensional printing method according to claim 5,
wherein, in the forming of the color layer, an ink composition for a support material having the following composition is further jetted out a plurality of times, and
the ink composition for a support material contains a monofunctional acrylate compound, a polymerization initiator, and a water-soluble non-curing component, in which, with respect to a total mass of the ink composition for a support material, a content of a polyfunctional acrylate compound is 5% by mass or less, and a colorant is not substantially contained in the ink composition for a support material.

* * * * *